(12) United States Patent
Maki et al.

(10) Patent No.: US 8,010,761 B2
(45) Date of Patent: Aug. 30, 2011

(54) STORAGE SYSTEM AND COPY METHOD

(75) Inventors: Nobuhiro Maki, Yokohama (JP);
Takeyuki Imazu, Kamakura (JP);
Hiroshi Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 798 days.

(21) Appl. No.: 12/107,994

(22) Filed: Apr. 23, 2008

(65) Prior Publication Data
US 2009/0216971 A1 Aug. 27, 2009

(30) Foreign Application Priority Data
Feb. 21, 2008 (JP) .................................. 2008-039601

(51) Int. Cl.
*G06F 12/00* (2006.01)
(52) U.S. Cl. ........ 711/162; 711/114; 711/156; 707/639; 707/649; 707/654
(58) Field of Classification Search ................... 711/162, 711/114, 156; 707/639, 649, 654
See application file for complete search history.

(56) References Cited

U.S. PATENT DOCUMENTS

| | | | | |
|---|---|---|---|---|
| 7,434,091 B1 * | 10/2008 | Karr | ............................. | 714/6.31 |
| 7,562,251 B1 * | 7/2009 | Karr | ............................. | 714/6.23 |
| 7,694,092 B2 * | 4/2010 | Mizuno | ........................ | 711/162 |
| 7,739,540 B2 * | 6/2010 | Akutsu et al. | ..................... | 714/3 |
| 2003/0131207 A1 | 7/2003 | Arakawa et al. | | |
| 2005/0154829 A1 | 7/2005 | Maki et al. | | |
| 2006/0271608 A1 | 11/2006 | Qi et al. | | |
| 2007/0038833 A1 | 2/2007 | Yamamoto et al. | | |
| 2007/0050589 A1 | 3/2007 | Tanaka et al. | | |
| 2007/0079099 A1 | 4/2007 | Eguchi | | |
| 2007/0300033 A1 * | 12/2007 | Kano | ............................ | 711/170 |
| 2008/0104347 A1 * | 5/2008 | Iwamura et al. | ............... | 711/162 |
| 2008/0104443 A1 * | 5/2008 | Akutsu et al. | ..................... | 714/6 |

FOREIGN PATENT DOCUMENTS

| | | |
|---|---|---|
| JP | 11-085408 | 3/1999 |
| JP | 2005-196618 | 7/2005 |
| JP | 2007-102455 | 4/2007 |

OTHER PUBLICATIONS

Extended European Search Report in EP08171173.1-1245/2093655, dated Jan. 12, 2011 (in English). [7 pages].

* cited by examiner

*Primary Examiner* — Stephen C Elmore
(74) *Attorney, Agent, or Firm* — Antonelli, Terry, Stout & Kraus, LLP.

(57) ABSTRACT

In a storage system, one or more storage apparatuses provide a management computer with a first volume for storing data from the management computer, provide a host computer with a second volume for storing data from the host computer, and manage a volume address for the one or more storage apparatuses to manage the first volume and the second volume in the one or more storage apparatuses. The management computer issues a command specifying an arbitrary volume address to the one or more storage apparatuses, and designates, when receiving a normal response from the arbitrary volume address, a volume with the arbitrary volume address as the second volume.

12 Claims, 16 Drawing Sheets

STORAGE INFORMATION TABLE 113

FIG.4

| | COPY INFORMATION | ~11401 |
| | COPY STATUS | ~11402 |

| PAIR NUMBER | PRIMARY HOST GROUP ID | SECONDARY HOST GROUP ID | PRIMARY STORAGE APPARATUS ID | PRIMARY H/W VOLUME ID | PRIMARY OS VOLUME ID | SECONDARY STORAGE APPARATUS ID | SECONDARY H/W VOLUME ID | SECONDARY OS VOLUME ID |
|---|---|---|---|---|---|---|---|---|
| 11403 | 11404 | 11405 | 11406 | 11407 | 11408 | 11409 | 11410 | 11411 |
| 1 | PMF | SMF | 14001 | 23:10 | 2310 | 14005 | 23:20 | N/A |
| 2 | POP | SOP | 14001 | 33:10 | 3310 | 14005 | 23:20 | N/A |
| ... | ... | ... | ... | ... | ... | ... | ... | ... |

COPY INFORMATION TABLE 114

LOCAL HOST GROUP ID TABLE 115

NON-OS-RECOGNIZED STORAGE INFORMATION TABLE 116

COPY PAIR MANAGEMENT INFORMATION 1210

| LOGICAL VOLUME ID | COPY STATUS INFORMATION | COPY TARGET STORAGE ID | COPY TARGET VOLUME ID | COPY PAIR ID | GROUP ID | COPY TYPE |
|---|---|---|---|---|---|---|
| 12101 | 12102 | 12103 | 12104 | 12105 | 12106 | 12107 |

VOLUME MANAGEMENT INFORMATION 1250

| LOGICAL VOLUME ID | VOLUME STATUS INFORMATION | CAPACITY | COPY PAIR ID | GROUP ID |
|---|---|---|---|---|
| 12501 | 12502 | 12503 | 12504 | 12505 |

FIG.12

I/O REQUEST IN CASE OF REMOTE TRANSFER REQUEST, I/O REQUEST 1  7300A

| DESTINATION (STORAGE APPARATUS ID + H/W VOLUME ID) | INSTRUCTION CONTENT (REMOTE TRANSFER) | CONTROL TARGET H/W VOLUME ID | GROUP ID | OPTION |
|---|---|---|---|---|
| 73001A | 73002A | 73003A | 73004A | 73005A |

I/O REQUEST 2  7300B

| DESTINATION (STORAGE APPARATUS ID + H/W VOLUME ID) | INSTRUCTION CONTENT | CONTROL TARGET H/W VOLUME ID | GROUP ID | OPTION |
|---|---|---|---|---|
| 73001B | 73002B | 73003B | 73004B | 73005B |

STORAGE SYSTEM AND COPY METHOD

CROSS-REFERENCES TO RELATED APPLICATIONS

This application relates to and claims priority from Japanese Patent Application No. JP2008-039601, filed on Feb. 21, 2008, the entire disclosure of which is incorporated herein by reference.

BACKGROUND

1. Field of the Invention

The invention relates generally to a storage system on which high security requirements are imposed and a method for the storage system, and is particularly suited to utilization in a technique for managing pairs, including both volumes recognized and volumes not recognized by a management computer or a host computer, together.

2. Description of Related Art

Examples of control systems employing storage apparatuses include an out-of-band system in which: a storage apparatus handles the control information that has passed through a network; and data is directly transferred between a host system such as a management computer or a host computer and the storage apparatus, and an in-band system in which a storage apparatus handles the control information and the data that have both passed through a data communication line. In a storage system on which high security requirements are imposed, employing an out-of-band system involves the risk that a host system sees the configurations and content of all the volumes in a storage apparatus. Therefore, the employment of in-band system is becoming more established.

Meanwhile, the continuity of a storage system and the data itself handled in the storage system have been growing in importance with the spread of information technology (IT). Therefore, the demand for protection for a storage system against unexpected situations such as terrorism and natural disaster is increasing. One of the techniques to meet the demand is disaster recovery. In disaster recovery, as disclosed in JP11-085408 A, data in a storage system is copied; the copied data is transferred to a remote place to be stored; and accordingly, it is possible for the storage system to be recovered even after the occurrence of a fault in the storage system due to a disaster, for example.

Also, in recent years, storage systems have been increasing in size, and there has been demand for the utilization of disaster recovery techniques in storage systems composed of plural host computers. In the above storage system, specific volumes in each of the host computers may be accessible for data in order to maintain data integrity for the host computers.

In light of the above, as disclosed in JP2005-196618 A, in order to achieve copy control targeted to all the volumes in the entire storage system using an in-band system, specific volumes to which data access is permitted and volumes to which data access is not permitted are included in one group, and giving a copy instruction to the group provides a management computer with a copy control interface on a group basis. As a result, copy can be conducted also for the volume that cannot be accessed by an arbitrary host computer.

Also, as disclosed in JP2007-102455 A, there is an in-band system technique in which a management computer can conduct copy control for an arbitrary volume via a special accessible volume (command device) in a storage apparatus. With this technique, the management computer specifies a logical volume address (hardware address) for a storage system with respect to a control target volume and issues a storage control command, enabling copy control for an arbitrary volume.

Plural host computers and one management computer conducting copy control for disaster recovery in a storage system using an in-band system will be discussed.

According to JP2005-196618 A, in a storage system with connected host computers, plural volumes including a copy control target volume are grouped, and this enables a management computer to achieve copy control collectively for the volumes requested by the respective host computers. However, according to the technique in JP2005-196618 A, copy control conducted by the management computer with respect to the volumes in the group is achieved, but copy control for an arbitrary volume cannot be conducted irrespective of whether the volume is in or out of the group.

Moreover, according to JP2007-102455 A, a storage control command needs to be issued to a command device in a storage system in order to enable copy control for an arbitrary volume; however, copy control cannot be performed originally for a volume not recognized by a management computer.

SUMMARY

The present invention has been made in light of the above, and therefore has an object of providing a storage system which can achieve copy control for all volumes, irrespective of volume kinds, i.e., logical volumes recognized and not recognized by a management computer that requests copy control and which employs an in-band system, and a copy method for the storage system.

In order to attain the above object, the invention provides a storage system in which a management computer and a host computer are connected to one or more storage apparatuses via a data communication line, characterized in that: the one or more storage apparatuses provide the management computer with at least one first volume for storing data from the management computer, provide the host computer with at least one second volume for storing data from the host computer, and manage a volume address for the one or more storage apparatuses to manage the first volume and the second volume in the one or more storage apparatuses; and the management computer issues a command specifying an arbitrary volume address to the one or more storage apparatuses, and designates, when receiving a normal response from the arbitrary volume address, a volume with the arbitrary volume address as the second volume.

As a result, the volume group recognized by the management computer and the not-recognized volume group can be subjected to pair setting, and therefore, copy can be collectively conducted between the volumes set as a pair.

Also, the invention provides a copy method for a storage system in which a management computer and a host computer are connected to one or more storage apparatuses via a data communication line, the method characterized by including: under the control of the one or more storage apparatuses, providing the management computer with at least one first volume for storing data from the management computer, providing the host computer with at least one second volume for storing data from the host computer, and managing a volume address for the one or more storage apparatuses to manage the first volume and the second volume in the one or more storage apparatus; and under the control of the management computer, issuing a command specifying an arbitrary volume address to the one or more storage apparatuses, and designating, when receiving a normal response from the arbitrary volume address, a volume with the arbitrary volume address as the second volume.

As a result, the volume group recognized by the management computer and the not-recognized volume group can be subjected to pair setting, and therefore, copy can be collectively conducted between the volumes set as a pair.

In order to detect the logical volume not recognized by an OS in the management computer, the management computer specifies, to the storage apparatus, a hardware address uniquely managed by the storage apparatus for a storage control command (I/O request), and issues the command. The storage control command is issued sequentially while changing the relevant hardware address. Then, the management computer determines the presence or absence of the logical volume not recognized by the OS based on the presence or absence of a response from the storage apparatus. The management computer identifies the logical volume not recognized by the OS in line with the volumes recognized and managed by the OS in the computer. Also, when conducting copy for the logical volume not recognized by the OS, the management computer issues a control command via the logical volume (command device) recognized by the OS. Moreover, when conducting copy for the logical volume recognized by the OS, the management computer issues a control command directly the logical volume recognized by the OS.

According to the invention, copy can be conducted for all the volumes irrespective of the volume kinds, i.e., the logical volumes recognized and not recognized by a management computer that makes a copy request.

Also according to the invention, high-level security can be achieved with a storage system employing an in-band system.

Other aspects and advantages of the invention will be apparent from the following description and the appended claims.

BRIEF DESCRIPTION OF THE DRAWINGS

FIG. 4 is a diagram showing a copy information table in the first embodiment.

FIG. 12 is an explanatory diagram showing a configuration for an I/O request when using a remote transfer request in the first embodiment.

DETAILED DESCRIPTION OF PREFERRED EMBODIMENTS

Embodiments of the present invention will be described with reference to the accompanying drawings.

(1) First Embodiment (1-1) System Configuration

Figure 1:
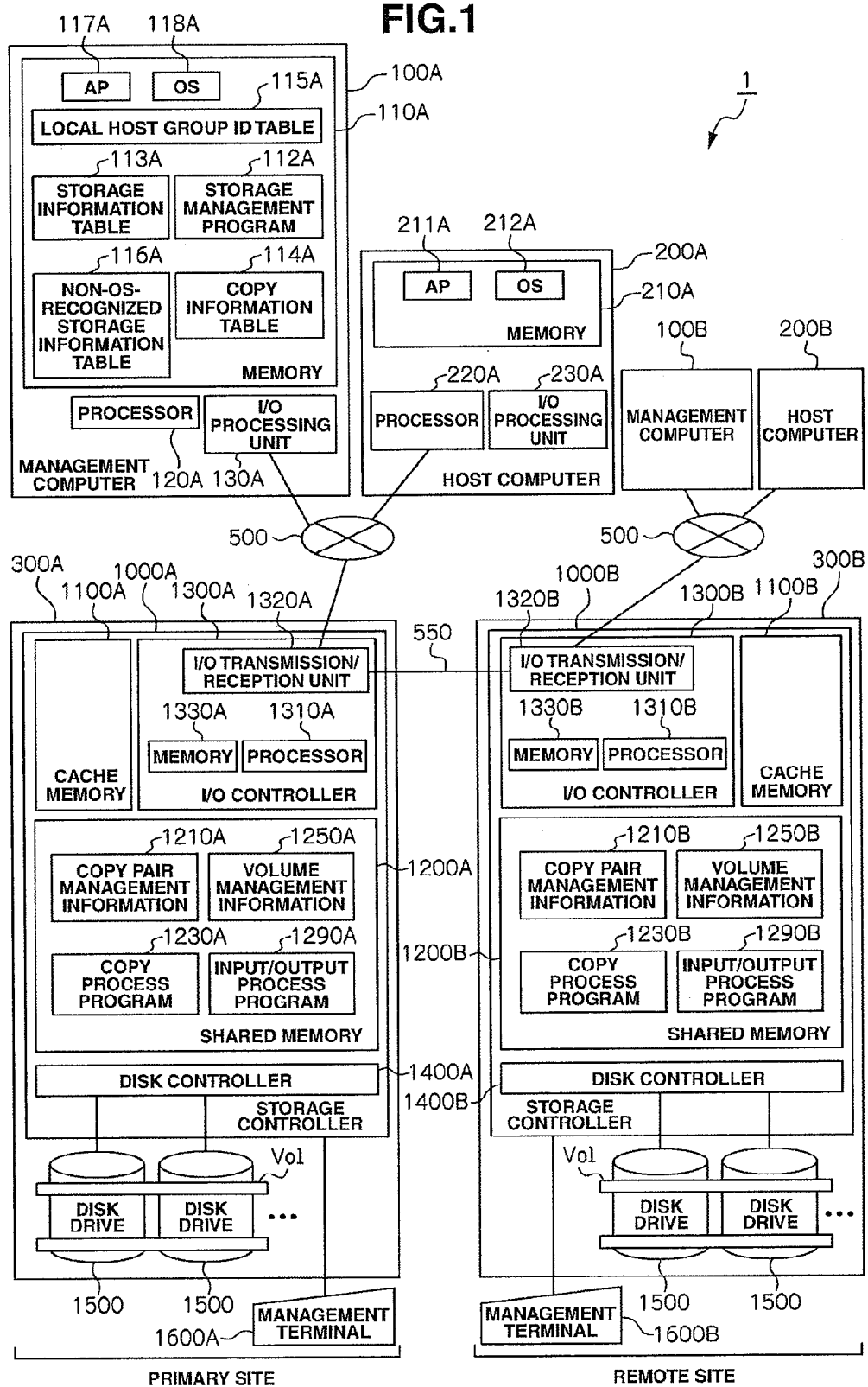
FIG. 1 is a block diagram showing a configuration for a storage system in accordance with a first embodiment.

FIG. 1 is a block diagram showing a configuration for a storage system 1 in a first embodiment of the invention.

The storage system 1 has a configuration in which: storage apparatuses 300 are arranged respectively for a primary site and a remote site; and the storage apparatuses 300 in the sites are connected to management computers 100, host computers 200, and management terminals 1600. Note that, in FIG. 1, the management computers, the host computers, and the other components in the storage system 1 are respectively given symbols A and B for the respective sites; however, the description in the specification is common to both components A and B when neither symbol is given. Moreover, one management computer 100, one host computer 200, and one storage apparatus 300 is shown for each site, but any number is not possible.

The management computer 100, the host computer 200, and the storage apparatus 300 are connected to one another via a communication line 500.

The management computer 100 is a computer including memory 110, a processor 120, and an I/O processing unit 130. The memory 110, the processor 120, and the I/O processing unit 130 are connected to one another via an internal network (not shown in the figure).

The processor 120 executes various kinds of processing by executing the programs stored in the memory 110. For example, the processor 120 transmits I/O requests to the storage apparatus 300 to control copy executed by the storage apparatus 300. Note that examples of the I/O requests include a write request, a read request, a remote transfer request, and a copy control request. The I/O request will be described in detail with reference to FIG. 9.

The memory 110 stores, e.g., the programs executed by the processor 120 and information required by the processor 120. Specifically, the memory 110 stores a storage management program 112, a storage information table 113, a copy information table 114, a local host group ID table 115, and a non-OS-recognized storage information table 116. The memory 110 also stores an application program (hereinafter, AP) 117 and an OS (Operating System) 118. The AP 117 executes various kinds of processing. For example, the AP 117 provides a database function or a WEB server function. The OS 118 controls the entire processing of the management computer 100.

The storage management program 112 manages the storage apparatus 300 connected via the data communication line 500.

The storage information table 113 shows recognized management information about the storage apparatus 300 managed by the management computer 100. One storage information table 113 is created for one storage apparatus 300. The storage information table 113 will be described in detail with reference to FIG. 3.

The copy information table 114 shows information for managing the copy configuration and status. The copy information table 114 will be described in detail with reference to FIG. 4.

The local host group ID table 115 stores an identifier indicating a set of logical volumes Vol in the storage apparatus 300 to which the management computer 100 is directly accessible via the data communication line 500. A host group ID is an ID uniquely indicating a set of logical volumes Vol accessible by the management computer 100. The local host group ID table 115 will be described in detail with reference to FIG. 5.

The non-OS-recognized storage information table 116 shows non-recognized management information about the storage apparatus 300 managed by the management computer 100. For this information, a set of information relating to the logical volumes not recognized by the OS 118 is registered. The non-OS-recognized storage information table 116 will be described in detail with reference to FIG. 6.

The I/O processing unit 130 is an interface connected to the host computer 200 and the storage apparatus 300 via the data communication line 500.

The host computer 200 is a computer provided with memory 210, a processor 220, and an I/O processing unit 230.

The memory 210, the processor 220, and the I/O processing unit 230 are connected to one another via an internal network (not shown in the figure).

The processor 220 executes various kinds of processing by executing the programs stored in the memory 210. For example, the processor 220 accesses the logical volume Vol provided by the storage apparatus 300 by transmitting an I/O request to the storage apparatus 300.

The memory 210 stores the programs executed by the processor 220, information required by the processor 220, etc. Specifically, the memory 210 stores an AP 211 and an OS 212.

The AP 211 executes various kinds of processing. For example, the AP 211 provides a database function or a WEB server function. The OS 212 controls the entire processing of the host computer 200.

The I/O processing unit 230 is an interface connected to the management computer 100 and the storage apparatus 300 via the data communication line 500. Specifically, the I/O processing unit 230 transmits an I/O request to the storage apparatus 300.

A storage apparatus 300A and a storage apparatus 300B are connected to each other via the data communication line 550. Also, the storage apparatus 300 is provided with a storage controller 1000 and disk drives 1500.

Each of the disk drives 1500 is a disk type drive for a storage medium, and stores the data requested to be written by the host computer 200. Instead of the disk drive 1500, other kinds of storage devices (e.g., flash memory drives) may be employed. The storage controller 1000 controls the entire storage apparatus 300. Specifically, the storage controller 1000 controls data-write/data-read to/from the disk drive 1500. The storage controller 1000 also provides the host computer 200 with one or more logical volumes Vol formed on the physical volume of the disk drive 1500.

The storage controller 1000 includes cache memory 1100, shared memory 1200, an I/O controller 1300, and a disk controller 1400.

The cache memory 1100, the shared memory 1200, the I/O controller 1300, and the disk controller 1400 are connected to one another via an internal network (not shown in the figure).

The cache memory 1100 temporarily stores the data written to/read from the disk drive 1500.

The disk controller 1400 controls data-write/-read to/from the disk drive 1500. The disk controller 1400 also creates a logical volume on the physical volume of the one or more disk drives 1500.

The I/O controller 1300 includes a processor 1310, an I/O transmission/reception unit 1320, and memory 1330. The processor 1310, the I/O transmission/reception unit 1320, and the memory 1330 are connected to one another via an internal network (not shown in the figure).

The I/O transmission/reception unit 1320 is an interface connected to the management computer 100, the host computer 200, and another storage apparatus 300 via the data communication line 500. Specifically, the I/O transmission/reception unit 1320 receives I/O requests from the management computer 100 or the host computer 200. The I/O transmission/reception unit 1320 also transmits the data read from the disk drive 1500 to the management computer 100 or the host computer 200. Moreover, the I/O transmission/reception unit 1320 transmits/receives the data exchanged between the storage apparatuses 300.

The processor 1310 executes various kinds of processing by executing the programs stored in the memory 1330 or the shared memory 1200. Specifically, the processor 1310 processes the I/O requests received by the I/O transmission/reception unit 1320.

The memory 1330 stores the programs executed by the processor 1310, the information required by the processor 1310, etc.

The shared memory 1200 stores the programs executed by the processor 1310, the information required by the processor 1310, etc. The shared memory 1200 also stores the programs executed by the disk controller 1400, the information required by the disk controller 1400, etc. Specifically, the shared memory 1200 stores copy pair management information 1210, a copy process program 1230, volume management information 1250, and an input/output process program 1290.

The copy pair management information 1210 is information for managing a copy pair including the logical volume Vol provided by the storage apparatus 300. The copy pair indicates two logical volumes Vol serving as a copy target. Note that copy processing will be described in detail with reference to FIG. 15, etc. Also, the copy pair management information 1210 will be described in detail with reference to FIG. 7.

The copy process program 1230 performs initial copy and differential copy. The input/output process program 1290 processes the I/O requests received by the I/O transmission/reception unit 1320.

The volume management information 1250 is information for managing the logical volumes Vol provided by the storage apparatus 300. Note that the volume management information 1250 will be described in detail with reference to FIG. 8.

The management terminal 1600 is connected to the storage controller 1000 provided in the storage apparatus 300. The management terminal 1600 is a computer provided with a processor, memory, and an interface. The management terminal 1600 transmits the information input by a system user to the storage controller 1000 in the storage apparatus 300.

(1-2) Description of Copy Control

Figure 2:
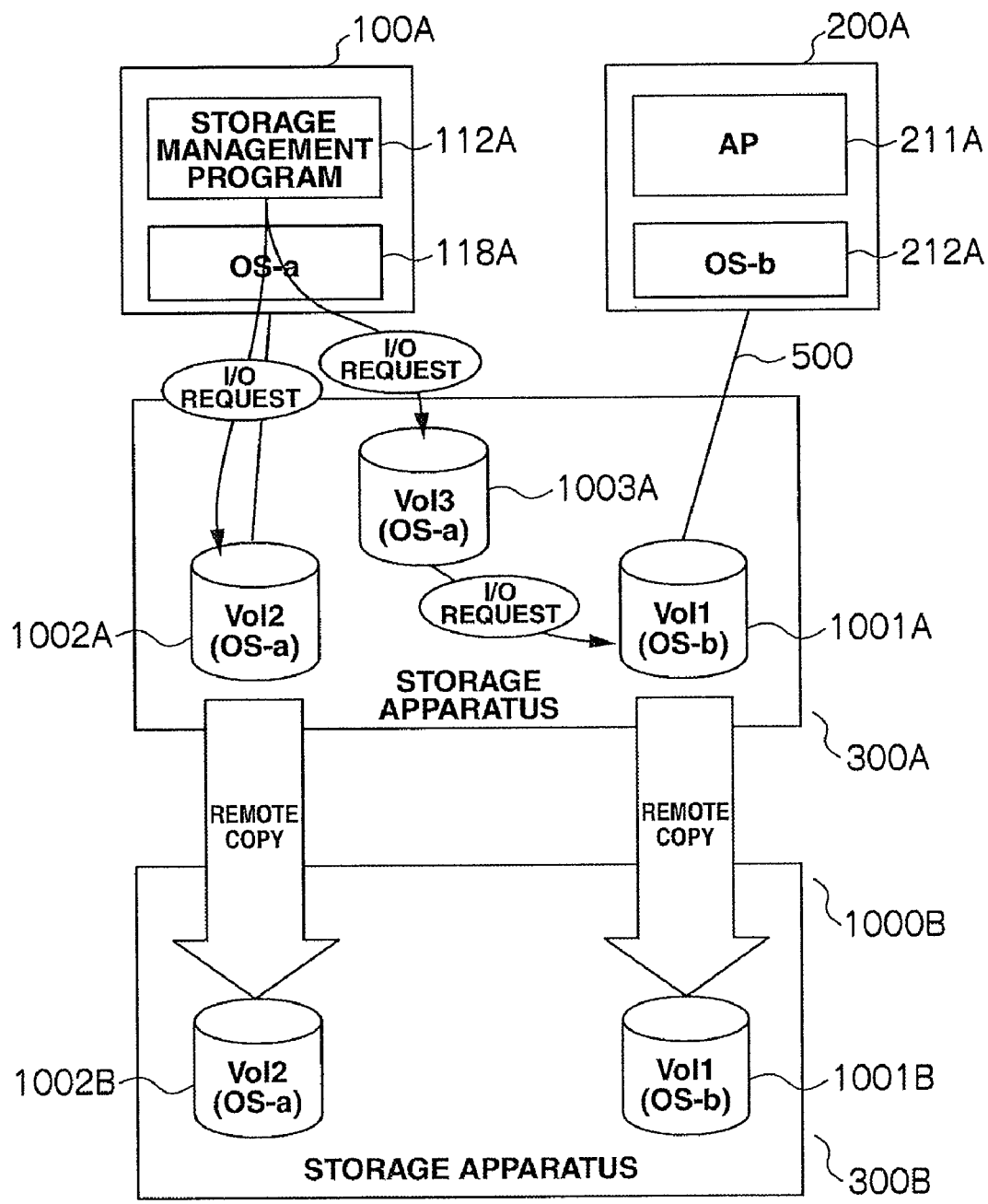
FIG. 2 is an explanatory diagram showing copy control in the first embodiment.

FIG. 2 is an explanatory diagram for copy control involving the logical volume Vol, which is not recognized by the OS 118A in the management computer 100A, in the storage apparatus 300 in the first embodiment of the invention.

The storage apparatus 300A has three logical volumes 1001A, 1002A, and 1003A. The logical volumes 1001A, 1002A, and 1003A are logical volumes provided by the one or more physical volumes of the one or more disk drives 1500. The logical volumes 1002A and 1003A are recognized by the management computer 100A connected to the storage apparatus 300A. The logical volume 1001A is recognized by the host computer 200A connected to the storage apparatus 300A. Note that, to prevent information leakage and data destruction, the logical volumes recognized by the management computer 100A and the host computer 200A are not allowed to be recognized by other computers. Also, other host computers are not allowed to acquire the configuration information for the storage apparatus using an IP network.

Copy of the content in the logical volumes 1001A and 1002A in the storage apparatus 300A to logical volumes 1001B and 1002B in the storage apparatus 300B will be discussed here. In this copying, the management computer 100A needs to instruct the logical volumes recognized by the management computer 100A in the storage apparatus 300A to start the copy from the logical volume 1001A to the logical volume 1001B and the copy from the logical volume 1002A to the logical volume 1002B. However, the management computer 100A does not recognize the logical volume 1001A, and so cannot create a copy control request for the logical volume 1001A.

Copying in this embodiment has the same meaning as copying, but may include the transfer of copy data to an arbitrary volume and storage of that data, depending on the description. Also, a logical volume Vol recognized by a host system (management computer 100 or host computer 200) means the logical volume Vol that can be identified by the OS in the host system and that can be operated directly by the host system for the reason that the disk drive 1500, to which the logical volume Vol belongs, and the host system are physically or logically connected to each other. Meanwhile, a logical volume not Vol recognized by a host system (management computer 100 or host computer 200) means the logical volume Vol that cannot be identified by the OS in the host system and that cannot be operated directly by the host system for the reason that the disk drive 1500, to which the logical volume Vol belongs, and the host system are not physically or logically connected to each other.

In light of the above, two means are combined to control an arbitrary logical volume Vol in this embodiment. First, regarding the first means, the management computer 100 acquires the information about the logical volume 1001A via the logical volume 1003A (first volume) recognized by the management computer 100. Next, regarding the second means, the management computer 100 issues copy control requests directly to the logical volumes 1002A and 1003A recognized by the management computer 100 itself, and issues a copy control request indirectly to the (non-recognized) logical volume 1001A (second volume) not recognized by the management computer 100 itself via the logical volume 1003A recognized by the management computer 100 itself. The logical volume 1003A receives a command from the host system, and sets a command device (command volume) that enables transmission of a command to the unrecognized logical volume.

The above has been explained taking the case of high-level security for the storage apparatus 300 as an example. The method in this embodiment can also be utilized in, e.g., the case where the management computer 100 and the host computer 200 are in different platforms (mainframe system and open system).

(1-3) Storage Information Table

Figure 3:
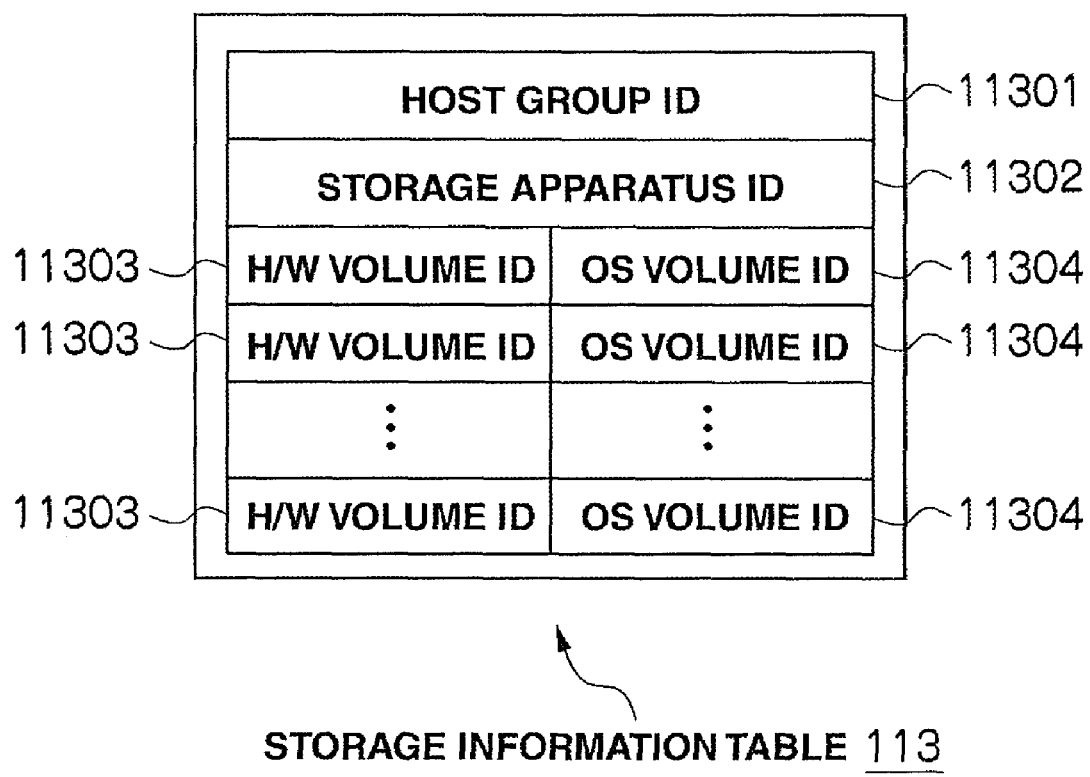
FIG. 3 is a diagram showing a storage information table in the first embodiment.

FIG. 3 is a structural diagram of the storage information table 113 stored in the management computer 100. Processing for creating the storage information table 113 will be described below.

The storage information table 113 is a table showing information about the logical volumes Vol recognized by the management computer 100, and includes a host group ID 11301, a storage apparatus ID 11302, a hardware (hereinafter, H/W) volume ID 11303, and an OS volume ID 11304.

The host group ID 11301 is a recognized group identifier, which indicates storage information tables 113 acquired by the management computer 100 using the same condition. For example, all the storage information tables 113 in the storage apparatuses 300 directly accessible by the management computer 100 have the same host group IDs.

The storage apparatus ID 11302 is an identifier for the storage apparatus 300 managed by the management computer 100.

The H/W volume ID 11303 is an identifier that is used for internal processing in the storage apparatus 300 indicated by the storage apparatus ID 13002 and which the storage apparatus gives to the logical volume Vol to be managed in the storage apparatus 300.

The OS volume ID 11304 is an identifier, which is assigned by the OS 118 in the management computer 100, for the logical volume Vol in the storage apparatus 300 indicated by the storage apparatus ID 11302.

(1-4) Copy Information Table

FIG. 4 is a structural diagram of the copy information table 114 stored in the management computer 100. A copy information table 114A is a table created after the management computer 100A acquires a storage information table 113A at the primary site, a storage information table 113B at the remote site, and a non-OS-recognized storage information table 116A, and will be described in detail below.

The copy information table 114 is a table created for each copy instruction issued by the management computer 100, and is given a copy group ID (copy group identifier) for each instruction.

The copy information table 114 includes copy information 11401, a copy status 11402, and copy configuration information 11403 to 11411.

The copy information 11401 includes copy type and copy option information. The copy type indicates whether the copy as a function provided by the storage apparatus 300 is local copy or remote copy. Local copy means copying conducted in the same storage apparatus 300, and in this case, the copy source logical volume Vol and the copy destination logical volume Vol exist in the same storage apparatus 300. Remote copy means copying conducted between different storage apparatuses 300, and in this case, the copy source logical volume Vol and the copy destination logical volume Vol exist in the different storage apparatuses 300A and 300B.

The copy option information is information indicating an option involved in each copy type. For example, the option information indicates whether writing to a secondary volume (copy destination logical volume Vol) is possible during suspension of local copy. Suspension of local copy means the suspension of local copy due to an instruction from the management computer 100.

The copy status 11402 shows the present status for copying managed by the copy information table 114. For example, the copy status 11402 indicates which status the status for the copy managed by the copy information table 114 is from among a copy status, suspended status, pair status, and abnormal status.

The copy configuration information includes the pair number 11403, primary host group ID 11404, secondary host group ID 11405, primary storage apparatus ID 11406, primary H/W volume ID 11407, primary OS volume ID 11408, secondary storage apparatus ID 11409, secondary H/W volume ID 11410, and secondary OS volume ID 11411.

The pair number 11403 is a sequence number, and manages a copy order.

The primary host group ID 11404 is an identifier that the management computer 100A processes as a copy source logical volume Vol (hereinafter, primary volume), and the primary host group ID 11404 registers the host group ID 11301 in the storage information table 113.

The secondary host group ID 11405 is an identifier that a management computer 100B processes as a copy destination logical volume Vol (hereinafter, secondary volume), and the secondary host group ID 11405 registers the host group ID 11301 in the storage information table 113.

The primary storage apparatus ID 11406 is an identifier for the storage apparatus on the primary side (hereinafter, primary storage apparatus) 300A that provides the copy source logical volume Vol. The primary storage apparatus 300A directly stores the data from the host systems 100A and 200A.

The primary H/W volume ID 11407 is an identifier that the primary storage apparatus 300A gives to a primary volume to be managed in the primary storage apparatus 300A.

The primary OS volume ID 11408 is an identifier given to a primary volume to be managed by the management computer 100A.

The secondary storage apparatus ID 11409 is an identifier for the storage apparatus on the secondary side (hereinafter, secondary storage apparatus) 300B that provides the copy destination secondary volume Vol. In local copying, the secondary storage apparatus ID 11409 is the same as that for the primary storage apparatus 300A.

The secondary H/W volume ID 11410 is an identifier that the secondary storage apparatus 300B gives to a secondary volume to be managed in the secondary storage apparatus 300B.

The secondary OS volume ID 11411 is a logical volume Vol identifier given to a secondary volume to be managed by the management computer 10B.

(1-5) Local Host Group ID Table

Figure 5:
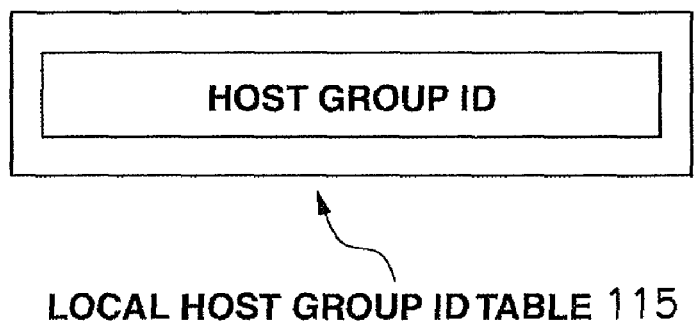
FIG. 5 is a diagram showing a local host group ID table in the first embodiment.

FIG. 5 is a structural diagram of the local host group ID table 115 stored in the management computer 100.

The local host group ID table 115 stores a group identifier given to a group of logical volumes recognized by the management computer 100.

(1-6) Non-OS-Recognized Storage Information Table

Figure 6:
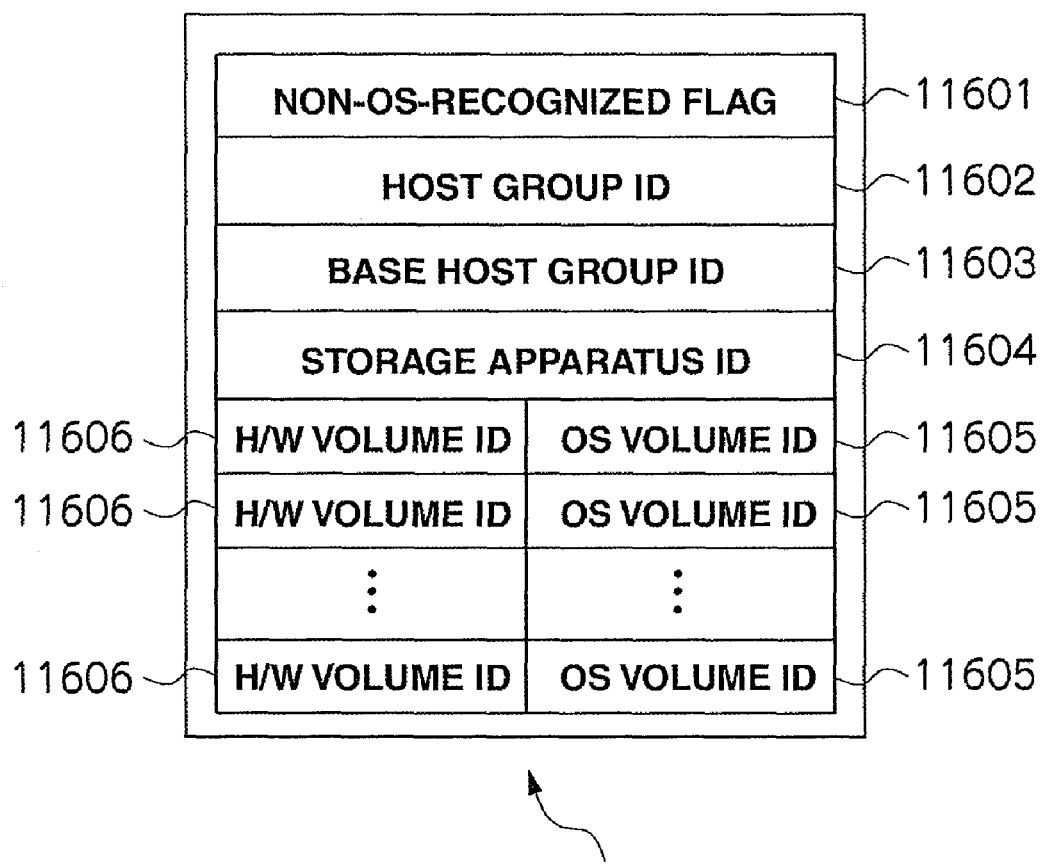
FIG. 6 is a diagram showing a non-OS-recognized storage information table in the first embodiment.

FIG. 6 is a structural diagram of the non-OS-recognized storage information table 116 stored in the management computer 100. Processing for creating the non-OS-recognized storage information table 116 will be described below.

The non-OS-recognized storage information table 116 is a table for managing the logical volumes Vol not recognized by the OS 118 in the management computer 100, and includes a non-recognized flag 11601 not recognized by the OS 118, a host group ID 11602, a base host group ID 11603, a storage apparatus ID 11604, H/W volume IDs 11606, and OS volume IDs 11605.

The non-OS-recognized flag 11601 is a flag that indicates whether or not the OS 118 in the management computer 100 recognizes the information about the storage apparatus 300 registered in the storage information table 113.

The host group ID 11602 is a non-recognized group identifier, and is a group ID indicating a group of logical volumes not recognized by the OS 118 in the management computer 100.

The base host group ID 11603 is a host group ID indicating the information about the storage apparatus 300 recognized by the OS 118 in the management computer 100. For example, all the storage information tables 113 for the storage apparatuses 300 directly accessible by the management computer 100 have the same host group IDs.

The storage apparatus ID 11604 is an identifier for the storage apparatus 300 managed by the management computer 100.

The H/W volume ID 11606 is an identifier for the logical volume Vol used in internal processing of the storage apparatus 300 indicated by the storage apparatus ID 11604.

The OS volume ID 11605 is a logical volume Vol identifier that is given to the logical volume Vol in the storage apparatus 300 indicated by the storage apparatus ID 11604 and that is assigned by the OS 118 in the management computer 100.

With the non-OS-recognized storage information table 116, the volume IDs respectively managed by the storage apparatus 300 and the management computer 100 can be made to correspond to each other with respect to the same logical volume.

(1-7) Copy Pair Management Information

Figure 7:
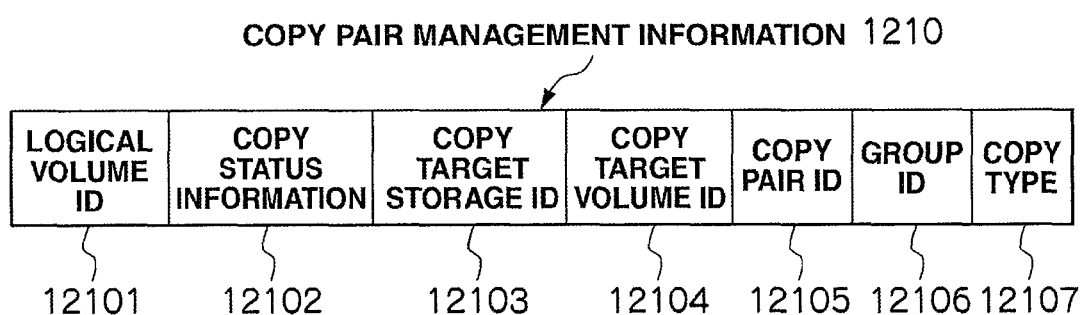
FIG. 7 is a diagram showing copy pair management information in the first embodiment.

FIG. 7 is a structural diagram of the copy pair management information 1210 stored in the storage apparatus 300 in the first embodiment of the invention.

The copy pair management information 1210 includes a logical volume ID 12101, copy status information 12102, a copy target storage ID 12103, a copy target volume ID 12104, a copy pair ID 12105, a group ID 12106, and a copy type 12107.

The logical volume ID 12101 is an identifier for the logical volume provided by the storage apparatus 300 that stores the copy pair management information 1210, and is an H/W volume ID.

The copy status information 12102 shows the current status of copy with respect to the logical volume Vol identified by the logical volume ID 12101. Specifically, the copy status information 12102 shows which status the logical volume Vol identified by the logical volume ID 12101 has from among a primary volume status, secondary volume status, copy status, suspended status, and abnormal status.

The copy target storage ID 12103 is an identifier for the storage apparatus 300 that provides the logical volume Vol that forms a copy pair with the logical volume Vol identified by the logical volume ID 12101. More specifically, the copy target storage ID 12103 stores an identifier for the secondary storage apparatus 300B.

The copy target volume ID 12104 is an identifier for the logical volume Vol that forms a copy pair with the logical volume Vol identified by the logical volume ID 12101. More specifically, the copy target volume ID 12104 stores an identifier for the secondary volume serving as a copy destination for the data stored in the logical volume Vol identified by the logical volume ID 12101.

The copy pair ID 12105 is an identifier for a copy pair including the logical volume Vol identified by the logical volume ID 12101 and the logical volume Vol identified by the copy target volume ID 12104. Specifically, the copy pair ID 12105 registers the pair number 11403 in the copy information table 114 that has been described with reference to FIG. 4.

The copy group ID 12106 is an identifier for the copy group to which the copy pair identified by the copy pair ID 12105 belongs. The storage apparatus 300 manages a copy group including one or more copy pairs. Therefore, the management computer 100 can specify a copy group to order the suspension, restart, or cancellation of local copy or remote copy collectively with respect to the copy pairs included in the copy group.

The copy type 12107 is a type of copy executed on the copy pair identified by the copy pair ID 12105. Specifically, the copy type 12107 stores either local copy or remote copy. Note that remote copy is stored for the copy type 12107 in this embodiment.

(1-8) Volume Management Information

Figure 8:
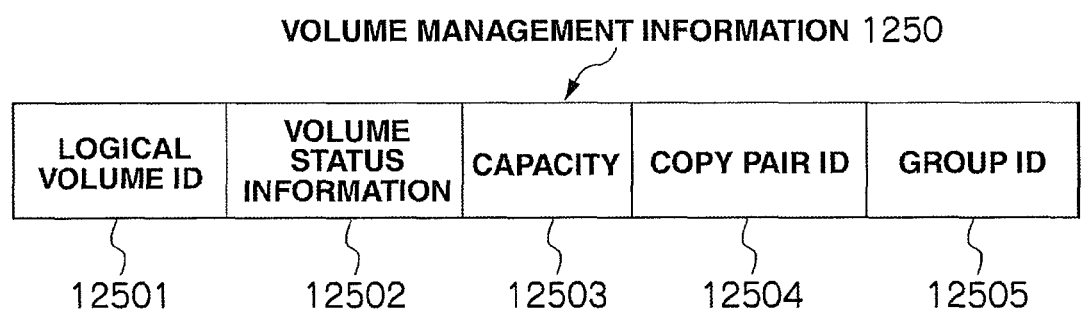
FIG. 8 is a diagram showing volume management information in the first embodiment.

FIG. 8 is a structural diagram of the volume management information 1250 stored in the storage apparatus 300 in the first embodiment of the invention.

The volume management information 1250 includes a logical volume ID 12501, volume status information 12502, a capacity 12503, a copy pair ID 12504, and a group ID 12505.

The logical volume ID 12501 is an identifier for the logical volume provided by the storage apparatus 300 that stores the volume management information 1250, and is an H/W volume ID.

The volume status information 12502 indicates the current status of the logical volume Vol identified by the logical volume ID 12501. Specifically, the volume status information 12502 stores at least one of "primary volume," "secondary volume," "normal," "abnormal," and "unloaded."

For example, when the logical volume Vol identified by the logical volume ID 12501 is a primary volume, the volume status information 12502 stores "primary volume." When the logical volume Vol identified by the logical volume ID 12501 is a secondary volume, the volume status information 12502 stores "secondary volume."

Also, when the host computer 200 can make normal access to the logical volume Vol identified by the logical volume ID 12501, the volume status information 12502 stores "normal." When the host computer 200 cannot make normal access to the logical volume Vol identified by the logical volume ID 12501, the volume status information 12502 stores "abnormal." For example, the volume status information 12502 stores "abnormal" when there is a failure of the disk drive 1500 or a copy fault.

When the logical volume Vol identified by the logical volume ID 12501 has not stored data, the volume status information 12502 stores "unloaded."

The capacity 12503 is the capacity of the logical volume Vol identified by the logical volume ID 12501. The copy pair ID 12504 is a unique identifier for a copy pair including the logical volume Vol identified by the logical volume ID 12501.

The copy pair ID 12504 is an identifier for the copy pair associated with the logical volume ID 12501. Specifically, the copy pair ID 12504 stores the pair number 11403 in the copy information table 114 that has been described with reference to FIG. 4.

The group ID 12505 is an identifier for a copy group to which the copy pair with the copy pair ID 12504 belongs. The group ID 12505 stores the copy group ID given to the copy information table 114 created for each copy instruction issued by the management computer 100.

(1-9) Content of I/O Request

Figure 9:
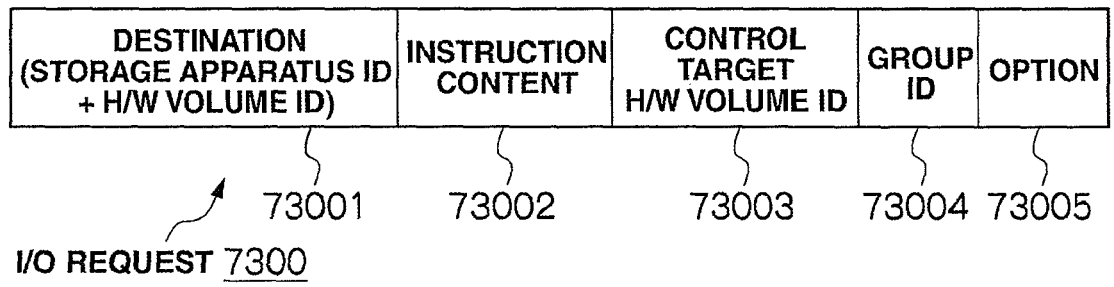
FIG. 9 is an explanatory diagram showing a configuration for an I/O request in the first embodiment.

FIG. 9 is an explanatory diagram for an I/O request 7300 in the first embodiment of the invention.

The I/O request 7300 is issued by the management computer 100 or the host computer 200. Also, the I/O request 7300 includes a destination 73001, instruction content 73002, a control target H/W volume ID 73003, a group ID 73004, and an option 73005.

The destination 73001 stores an identifier for the storage apparatus 300 and an identifier for the H/W volume that serves as a transmission destination for the I/O request 7300. For example, when the I/O request 7300 is transmitted to the logical volume Vol directly recognized by the management computer 100 or the host computer 200, the identifier for the directly recognized logical volume Vol is stored as an identifier for the H/W volume. When the I/O request 7300 is transmitted to the logical volume Vol not directly recognized by the management computer 100 or the host computer 200, an identifier for a command device is stored as an identifier for the H/W volume.

The instruction content 73002 is the content of processing ordered by the I/O request 7300. The instruction content 73002 is an instruction for remote copy control, an instruction for data access, etc. Specifically, the instruction content 73002 is a write request, a read request, or a copy control request. Moreover, examples of copy control requests include requests for remote copy start, remote copy suspension, remote copy restart, remote copy cancellation, local copy start, local copy suspension, local copy restart, local copy cancellation, and status acquisition.

The control target H/W volume ID 73003 is an identifier for a target logical volume Vol processed by the storage apparatus 300 based on the instruction content in the I/O request 7300. More specifically, the storage apparatus 300 executes processing for the instruction content with respect to the control target H/W volume ID 73003 included in the received I/O request 7300.

When the I/O request 7300 is transmitted to the logical volume Vol not directly recognized by the management computer 100 or the host computer 200, the control target H/W volume ID 73003 stores an identifier for the unrecognized logical volume Vol.

The group ID 73004 is an identifier for a copy group that serves as a target for the processing based on the I/O request 7300. The group ID 73004 stores the copy group ID given to the copy information table 114 created for each copy instruction issued by the management computer 100.

The option 73005 stores copy configuration information, option information that supports the I/O request 7300, data requested to be written in accordance with the I/O request, etc. Note that the copy configuration information includes, e.g., a copy type, a copy destination storage ID, a copy destination logical volume ID, a copy source storage ID, and a copy source logical volume ID.

(1-10) Storage Information Table Creation Processing

Next, processing for creating the storage information table 113 will be described. The processing for creating the storage information table 113 is executed by a processor 120A in the management computer 100A in accordance with a storage management program 112A.

Figure 10:
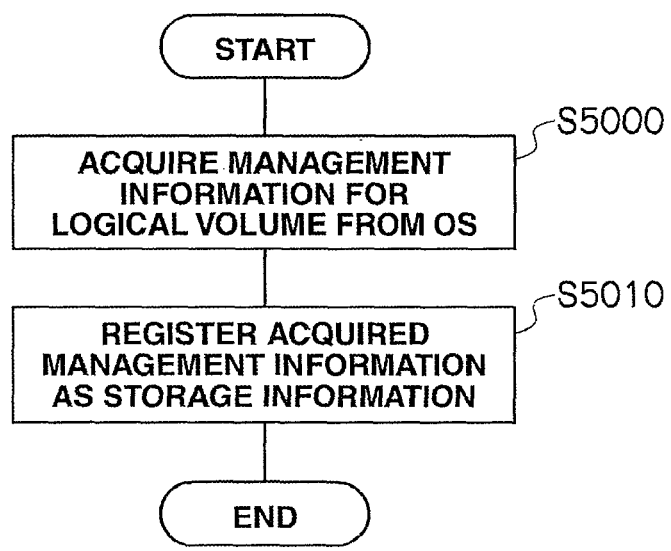
FIG. 10 is a flowchart for creating a storage information table in the first embodiment.

FIG. 10 is a flowchart for the creation, which is conducted by the management computer 100A, of the storage information table 113A concerning the storage apparatus 300A in the primary site.

The management computer 100A acquires, from an OS 118A, the management information for the logical volume Vol set via the input by a user (step 5000). The management information for the logical volume Vol input by a user includes a device number, a drive letter, a device file, etc. The management computer 100A acquires the information (storage system ID, H/W volume ID) about the storage apparatus 300A managed by the OS 118A via an operation interface of the OS 118A. When the information about the storage apparatus 300A acquired from the OS 118A is insufficient as information about the storage information table 113A, the management computer 100A may acquire more information from the storage apparatus 300A using an I/O request.

Then, the management computer 100A registers the information obtained in step 5000 as storage information in the storage information table 113A to create the storage information table 113A (step 5010). The storage information obtained in step 5000 is information including a host group ID, a storage apparatus ID, H/W volume IDs, and OS volume IDs. For the host group ID in the storage information table 113A, the ID previously registered in a local host group ID table 115A in the management computer 100A is registered.

(1-11) Non-OS-Recognized Storage Information Table Creation Processing

Next, the management computer 100A executes processing for creating the non-OS-recognized storage information table 116A (non-recognized volume creation unit).

The flow described below is one for creating the non-OS-recognized storage information table 116A, but is also executed for creating the storage information table 113A concerning the storage apparatus 300B in the remote site.

The processing for creating the non-OS-recognized storage information table 116A or the storage information table 113A for the storage apparatus 300B is executed by the processor 120A in the management computer 100A in accordance with the storage management program 112A.

Figure 11:
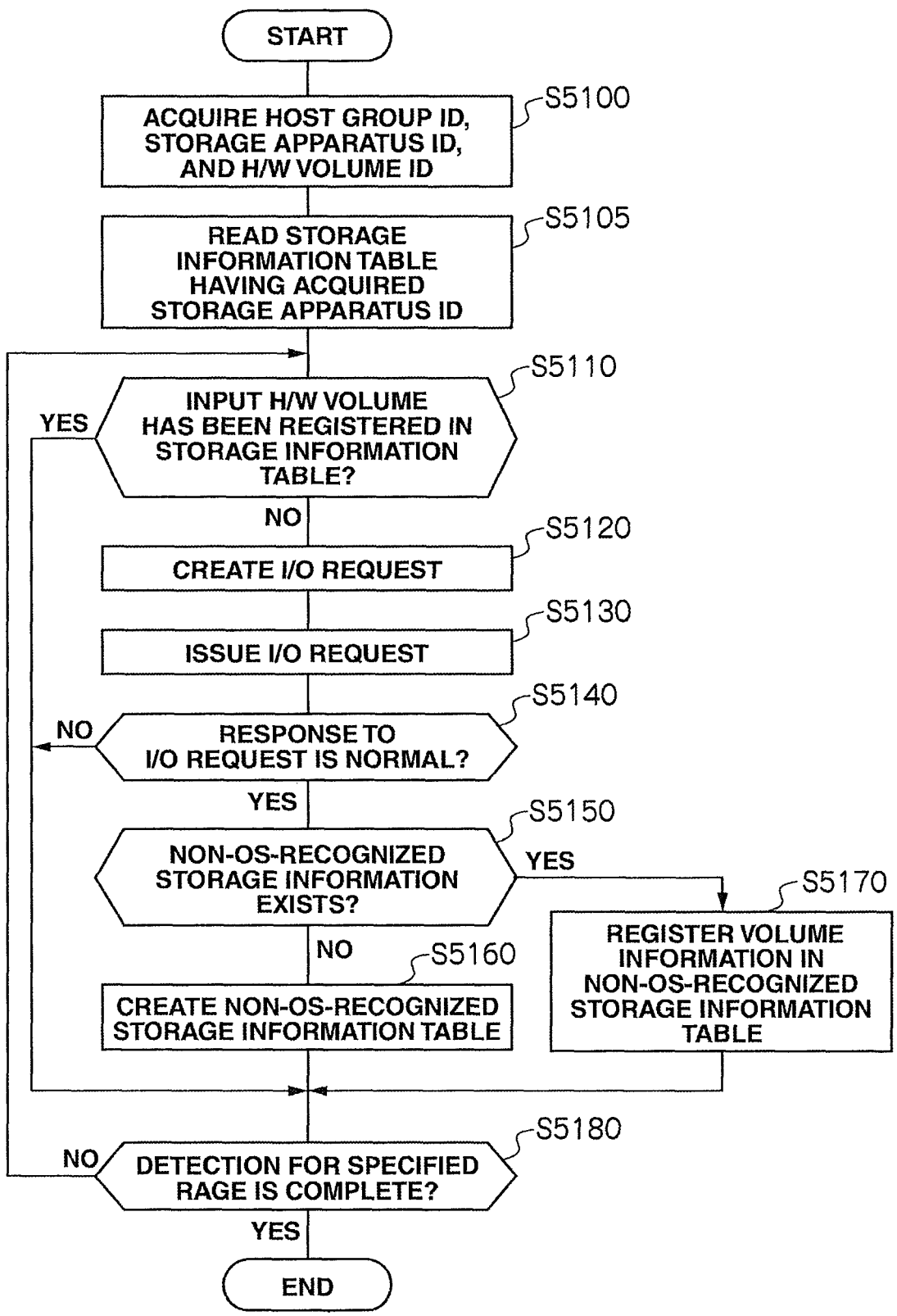
FIG. 11 is a flowchart for creating a non-OS-recognized storage information table in the first embodiment.

FIG. 11 shows a flow for creation, which is performed by the management computer 100A, of the non-OS-recognized storage information table 116A or the storage information table 113A for the storage apparatus 300B in the remote site.

For the assumptions for the management computer 100 to determine an unrecognized logical volume Vol, a user inputs a host group ID, a storage apparatus ID, and an H/W volume ID to the management computer 100A. The management computer 100A acquires the input information (step 5100). For the host group ID, an ID different from the local host group ID previously set in the management computer 100A is set. The H/W volume ID specifies an H/W volume ID(s) in an arbitrary range output in the screen of the management computer 100A regardless of whether the relevant volume is a recognized logical volume or an unrecognized logical volume.

It is assumed that the host group ID, the storage apparatus ID, and the H/W volume ID input by a user in step 5100 are respectively referred to as input host group ID, input storage apparatus ID, and input H/W volume ID.

Next, the management computer 100A reads, from memory 110A, the storage information table 113A including the local host group ID, which is previously registered in the management computer 100A, corresponding to the input storage apparatus ID obtained in step 5100 (step 5105).

Then, the management computer 100A judges whether the input H/W volume ID has been registered in the read storage information table 113A (step 5110).

If it is determined that the input H/W volume ID has been registered in the storage information table 113A as a result of the judgment in step 5110 (step 5110: Yes), the management computer 100A judges whether the next input H/W volume ID exists because the above input H/W volume ID as a judgment target indicates the logical volume Vol recognized by the management computer 100A (step 5180). At this point, the volume information that the management computer 100A selects next from the storage information table 113A may be selected in a fixed order or a random order.

Meanwhile, if it is determined that the input H/W volume ID has not been registered in the storage information table 113A as a result of the judgment in step 5110 (step 5110: No), the input H/W volume ID serving as a judgment target is the logical volume Vol not recognized by the management computer 100A. Therefore, the management computer 100A sets the content of the I/O request 7300 (step 5120).

Specifically, the management computer 100A acquires the storage apparatus ID 11302 and arbitrary volume information (logical volume Vol information consisting of the H/W volume ID 11303 and the OS volume ID 11304) from the storage information table 113A. The management computer 100A sets the storage apparatus ID and the H/W volume ID in the acquired information as the destination 73001 of the I/O request 7300.

Also, the management computer 100A sets "copy control request (status acquisition)" for the instruction content 73002 in the I/O request 7300, and set the input H/W volume ID for the control target H/W volume ID 73003.

The management computer 100A then issues the I/O request 7300 to the storage apparatus 300A, and waits for a response to the I/O request 7300 (step 5130).

Next, when the management computer 100A receives the response to the I/O request 7300 from the storage apparatus 300A, the management computer 100A judges whether or not the response to the I/O request 7300 is normal (step 5140).

If the response to the I/O request 7300 is normal (step 5140: Yes), this indicates the existence of the unrecognized logical volume Vol as a control target for the I/O request 7300.

Then, the management computer 100A searches for the non-OS-recognized storage information table 116A in which the host group ID 11602 is the input host group ID, the base host group ID 11603 is the local host group ID, and the storage apparatus ID 11604 is the input storage apparatus ID in the memory 110A (step 5150).

If it is determined that the storage information not recognized by the OS 118A does not exist in the non-OS-recognized storage information table 116A as a result of the judgment in step 5150 (step 5150: No), the management computer 100A creates the non-OS-recognized volume information table 116A in which the host group ID 11602 is the input host group ID, the base host group ID 11603 is the local host group ID, and the storage apparatus ID 11604 is the input storage apparatus ID (step 5160).

If it is determined that the storage information not recognized by the OS 118A exists in the non-OS-recognized storage information table 116A as a result of the judgment in step 5150 (step 5150: Yes), the management computer 100A adds volume information to the non-OS-recognized storage information table 116A (step 5170). Regarding the content of the volume information, the input H/W volume ID is additionally stored for the H/W volume ID 11606, and an arbitrary OS volume ID is additionally stored for the OS volume ID 11605.

Note that an arbitrary OS volume ID added for the OS volume ID 11605 needs to be distinguishable for a user. This can be realized, e.g., by the management computer 100 displaying the list of OS volume IDs and H/W volume IDs on the screen in step 5170, or by enabling a user to set an arbitrary value for the OS volume ID.

Finally, the management computer 100A judges whether or not a further input H/W volume ID exists. If a further H/W volume ID exists (step 5180: No), the processing from steps 5110 through 5170 will be repeated. If the H/W volume ID does not exist (step 5180: Yes), the management computer 100A terminates this processing.

As described above, the volumes not recognized by the management computer 100A can be found from the H/W volume IDs in an arbitrary range output in the screen of the management computer 100A.

(1-12) Creation Processing for Storage Information Table in Remote Site

Next, processing for creating the storage information table 113B in the remote site will be described. The storage information table 113B at the remote site is created by the management computer 100A in the primary site in accordance with the storage management program 112A or by the management computer 100B in the remote site.

When the management computer 100B in the remote site creates the storage information table 113B, storage information is acquired based on the same processing procedure as for the flow in FIG. 10, or the content of the storage information table 113B created in the management computer 100A is subjected to copy. Regarding the copy method, FTP, etc. via a network or a portable storage medium (USB memory or similar) may be employed. When this is not permitted in terms of security policy, the management computer 100A in the primary site creates the storage information table 113B as described below.

A method for the creation, which is conducted by the management computer 100A in the primary site, of the storage information table 113B will be described with reference to FIG. 11.

When the management computer 100A acquires the storage information table 113B concerning the storage apparatus 300B in the remote site in the processing of FIG. 11, the management computer 100A creates the I/O request 7300 employing a remote transfer request in step 5120. Employing the remote transfer request enables the I/O request 7300 to be transferred to the storage apparatus 300B in the remote site via the storage apparatus 300A.

Here, FIG. 12 shows a configuration example of the I/O request 7300 when using a remote transfer request. When the remote transfer request is used, the management computer 100A couples the I/O request 7300A and an I/O request 7300B to each other.

The management computer 100A sets the storage apparatus ID 11302 registered in the storage information table 113B and an arbitrary H/W volume ID in the same table for a destination 73001A in I/O request 1 (7300A). The management computer 100A sets a remote request (remote transfer) for instruction content 73002A, and sets an identifier for the command device in the storage apparatus 300A for a control target H/W volume ID 73003A. The management computer 100A also sets a copy group ID given to the copy information table 114A for a group ID 73004A, and sets a pointer for I/O request 2 (7300B) for an option 73005A.

Subsequently, regarding I/O request 2 (7300B), the management computer 100A sets the storage apparatus ID at the remote site and the H/W volume ID at the remote site for a destination 73001B, sets a copy control request (status acquisition) for instruction content 73002B, and sets the input H/W volume ID for a control target H/W volume ID 73003B. The management computer 100A executes the same processing procedure as in the flowchart in FIG. 11 except the point that the information about the storage apparatus 300B in the remote site is acquired using the remote transfer request.

(1-13) Copy Information Table Creation Processing

Figure 13:
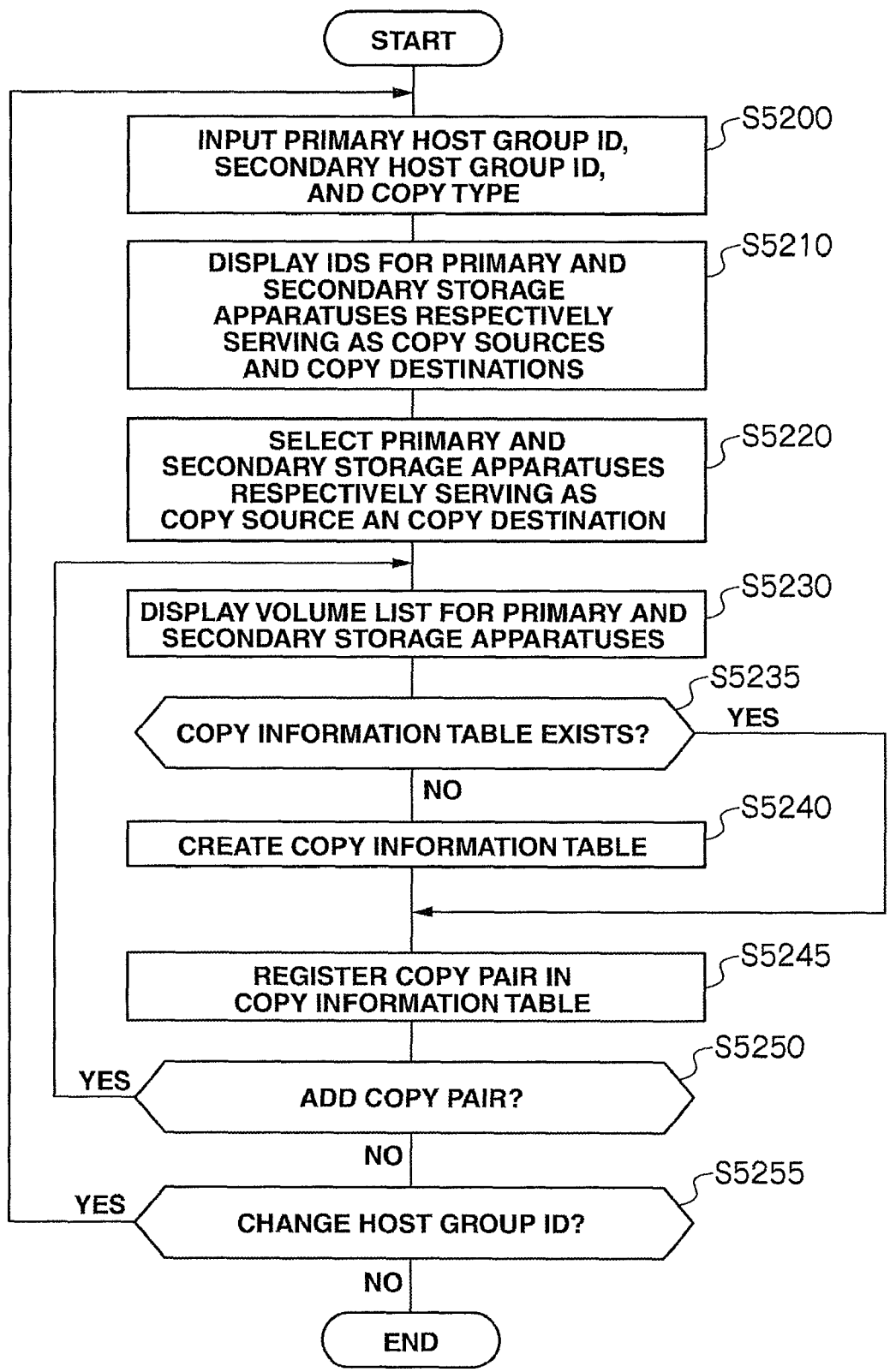
FIG. 13 is a flowchart for creating a copy information table in the first embodiment.

FIG. 13 shows a flow for creation, which is conducted by the management computer 100A, of the copy information table 114A. The management computer 100A creates the copy information table 114A in accordance with the storage management program 112A. The management computer 100A acquires the storage information table 113A at the primary site, the storage information table 113B at the remote site, and the non-OS-recognized storage information table 116A, and then creates the copy information table 114A.

A user inputs, via the screen of the management computer 100A, a copy source host group ID (referred to as primary host group ID), a copy destination host group ID (referred to as secondary host group ID), and a copy type (step 5200). Examples of copy types include local copy and remote copy.

After the input, the management computer 100A displays the storage apparatus IDs 13002 in all the storage information tables 113A, in which the host group ID corresponding to the primary host group ID has been registered, to indicate copy source primary storage apparatuses, and displays the storage apparatus IDs 13002 in all the storage information tables 113A, in which the host group ID corresponding to the secondary host group ID has been registered, to indicate copy destination secondary storage apparatuses (step 5210).

A user selects an arbitrary copy source primary storage apparatus and an arbitrary copy destination secondary storage apparatus from among the plural copy source primary storage apparatuses and copy destination secondary storage apparatuses displayed in step 5210 (step 5220).

Then, the management computer 100A refers to the storage information tables 113A in which the storage apparatus ID for the storage apparatus selected above has been registered, and displays the lists of OS volume IDs for the copy source primary storage apparatus and copy destination secondary storage apparatus (step 5230).

At this point, the management computer 100A confirms the presence or absence of the copy information table 114A corresponding to the memory 110A (step 5235).

If the copy information table 114A does not exist (step 5235: No), the management computer 100A creates the copy information table 114A based on the storage information table 113A (step 5240).

Next, a user selects a copy source OS volume ID and a copy destination OS volume ID via the screen of the management computer 100A so that the management computer 100A defines a copy pair. The management computer 100A adds the selected OS volume ID to the copy information table 114A (step 5245).

The management computer 100A confirms with a user regarding the presence or absence of a copy pair to be added (combination of primary and secondary volumes respectively serving as a copy source and a copy destination). If the copy pair addition needs to be conducted (step 5250: Yes), the management computer 100A executes processing again starting from step 5230.

Next, the management computer 100A checks the change of a host group ID (step 5255). If the management computer 100A changes the host group ID (step 5255: Yes), the management computer 100A returns to step 5200; meanwhile, if the management computer 100A does not change the host group ID (step 5255: No), the management computer 100A terminates this processing.

As described above, the management computer 100A can create a copy group by changing the host group ID even when the storage apparatus 300 has both the logical volumes Vol recognized by the OS 118 and the logical volumes Vol not recognized by the OS 118 together. The copy group indicates a set of plural copies, and the management computer 100A can perform collective copy operation by using the copy group. The copy group is given the above-mentioned copy group ID (copy group identifier).

(1-14) I/O Request Creation Processing

Figure 14:
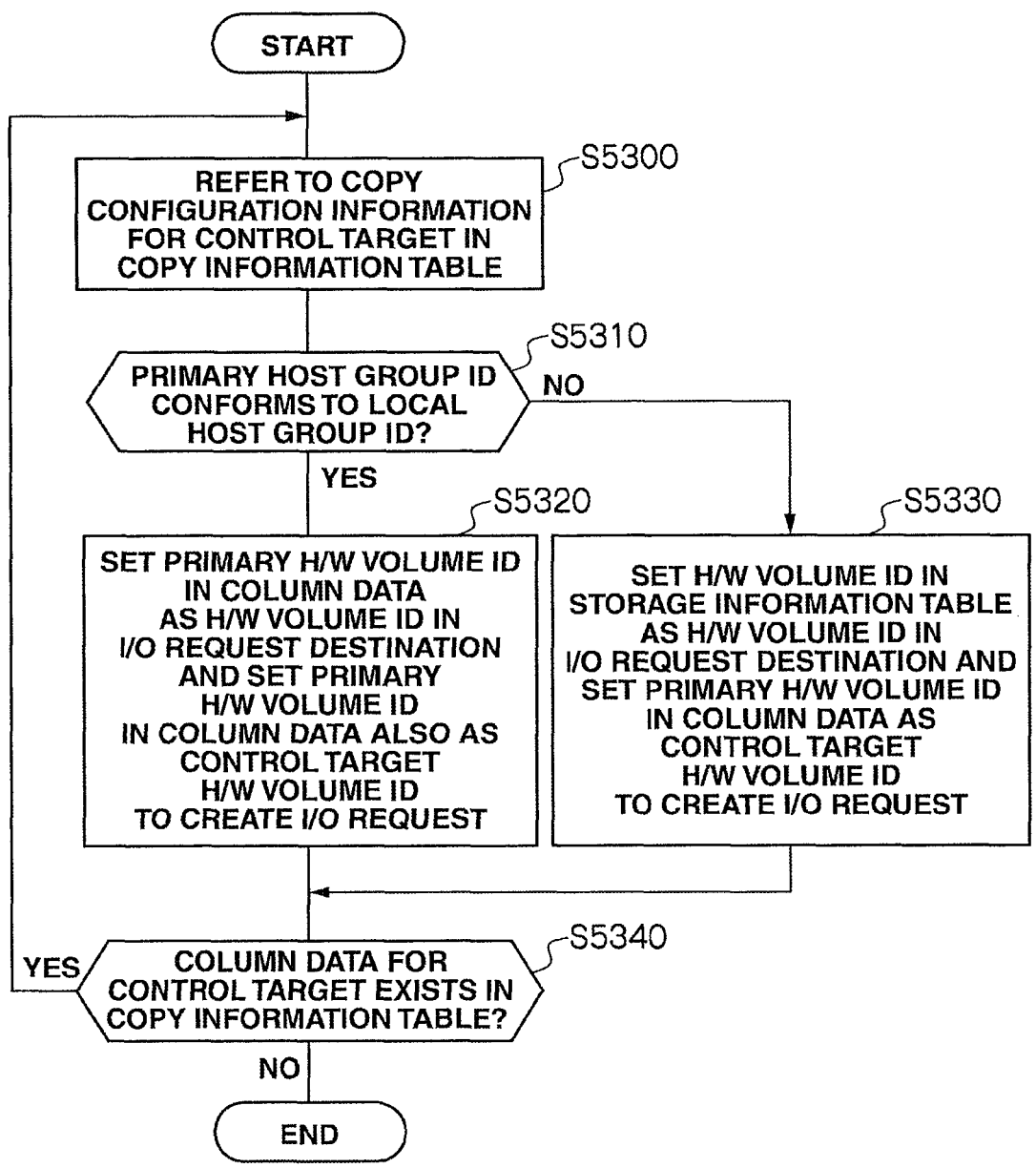
FIG. 14 is a flowchart for creating an I/O request when using a remote transfer request in the first embodiment.

FIG. 14 is a flowchart for creating an I/O request for copy control processing executed by the management computer 100A in the first embodiment. The management computer 100A creates the I/O request in accordance with the storage management program 112A.

When a user specifies the copy information table 114A and specifies a copy control instruction, the management computer 100A refers to arbitrary column data in the copy configuration information (information group of 11403 to 11411) in the copy information table 114A (step 5300).

The management computer 100A compares the primary host group ID 11404 in the column data to the local host group ID in the local host group ID table 115A (step 5310).

If the compared IDs correspond to each other as a result of step 5310 (step 5310: Yes), copy control is performed for the logical volume Vol recognized by the management computer 100A. Therefore, the management computer 100A registers the primary storage apparatus ID 11406 and the primary H/W volume ID 11407 in the above column data for the destination 73001 in the I/O request 7300, and registers the primary H/W volume ID 11407 in the column data also for the control target H/W volume ID 73003 in the I/O request 7300. For the instruction content 73002, the group ID 73004, and the option 73005 in the I/O request 7300, what is specified by a user is registered. The management computer 100A issues the resultant I/O request 7300 to the storage apparatus 300A (step 5320).

Meanwhile, if the compared IDs do not correspond to each other as a result of step 5310 (step 5310: No), copy control is performed for the logical volume Vol not recognized by the management computer 100A. The management computer 100A registers the primary storage apparatus ID 11406 in the column data and an arbitrary H/W volume ID 11303 registered in the storage information table 113A for the destination 73001 in the I/O request 7300, and sets the primary H/W volume ID 11407 in the column data for the control target H/W volume ID 73003. For the instruction content 73002, the group ID 73004, and the option 73005 in the I/O request 7300, what is specified by a user is registered. The management computer 100A issues the resultant I/O request 7300 to the storage apparatus 300A (step 5330).

Subsequently, the management computer 100A judges whether or not control target column data other than the column data referred to in step 5300 has been registered in the copy information table 114A (step 5340). If the column data has been registered (step 5340: Yes), the management computer 100A repeats this processing again starting from step 5300.

Meanwhile, if the column data has not been registered (step 5340: No), the management computer 100A terminates this processing.

(1-15) Initial Copy Processing

Next, the processing executed by the primary storage apparatus 300A that has received the I/O request 7003 from the management computer 100A after the creation of the I/O request 7300 by the management computer 100A and the following processing executed by the secondary storage apparatus 300B will be described.

Figure 15:
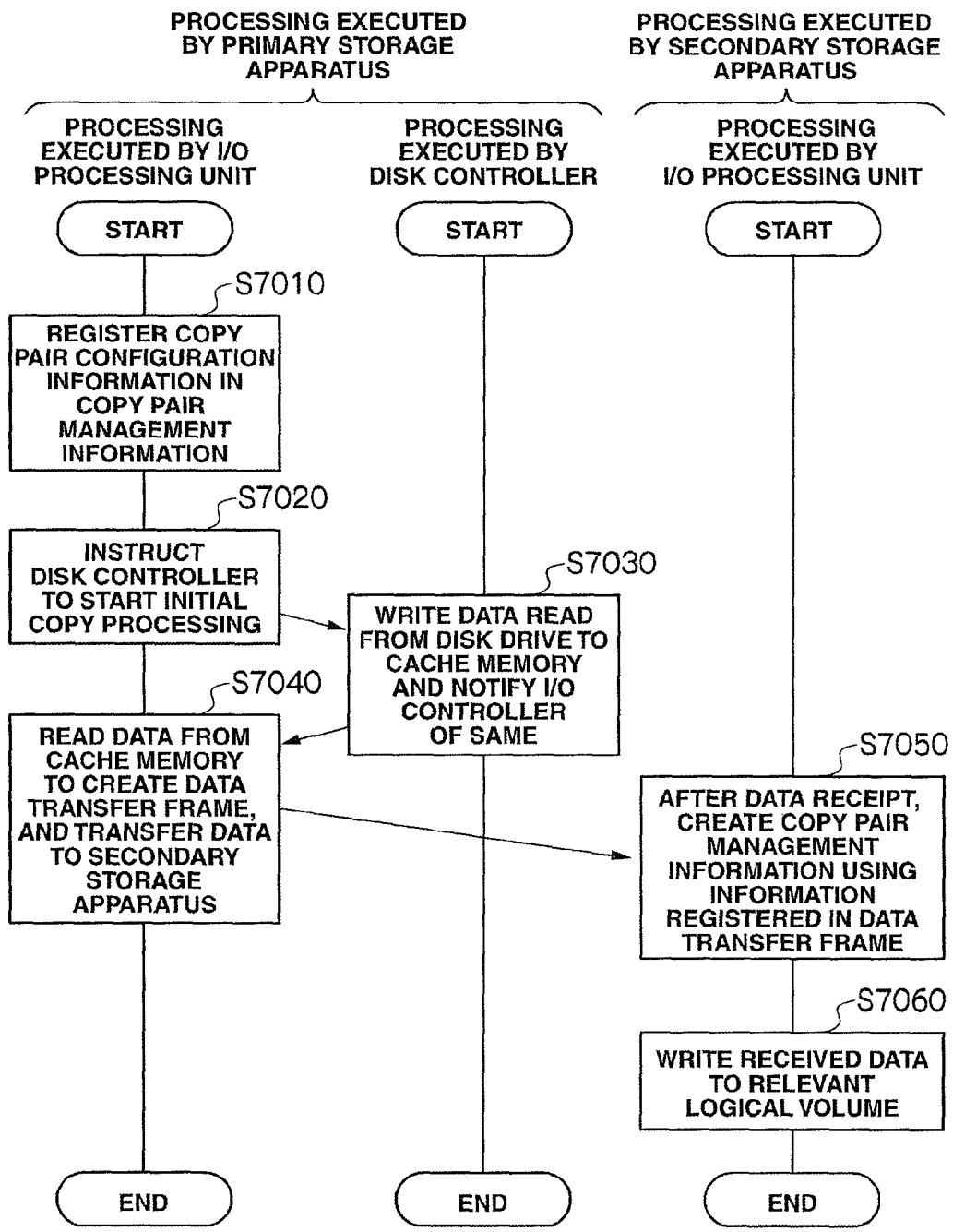
FIG. 15 is a flowchart of initial copy processing executed between primary and secondary storage apparatuses in the first embodiment.

FIG. 15 is a flowchart of initial copy processing executed by the primary and secondary storage apparatuses 300. The initial copy processing is processing for having primary volume data conform to secondary volume data. This processing is executed by the primary and secondary storage apparatuses 300 in accordance with the copy process programs 1230 and the input/output process programs 1290.

When an I/O controller 1300A in the primary storage apparatus 300A receives the I/O request 7300 that orders the start of remote copy, the primary storage apparatus 300A starts initial copy processing.

The I/O controller 1300A in the primary storage apparatus 300A creates copy pair management information 1210A based on the copy configuration information extracted from the received I/O request 7300 (step 7010).

Specifically, the I/O controller 1300A in the primary storage apparatus 300A stores the H/W volume ID 73003A in the I/O request 7300A, which serves to indicate a copy source primary volume, for the logical volume ID 12101 in the copy pair management information 1210. The I/O controller 1300A in the primary storage apparatus 300A then stores "initial copy" for the copy status information 12102 in the copy pair management information 1210.

Also, the I/O controller 1300A in the primary storage apparatus 300A stores the copy destination storage apparatus ID in the destination 73001B for the copy target storage ID 12103 in the copy pair management information 1210. The I/O controller 1300A in the primary storage apparatus 300A then stores the copy destination H/W volume ID 73003B in the I/O request 7300B for the copy target volume ID 12104 in the copy pair management information 1210. At this point, the I/O controller 1300A specifies the control target H/W volume ID 73003A in the I/O request 7300A as a command device.

Moreover, the I/O controller 1300A in the primary storage apparatus 300A stores the pair number obtained from the option 73005A in the I/O request 7300A for the copy pair ID 12105. The I/O controller 1300A in the primary storage apparatus 300A stores the group ID 73004 acquired from the I/O request 7300 for the group ID 12106. The I/O controller 1300A in the primary storage apparatus 300A then stores the copy type included in the extracted copy configuration information for the copy type 12107 in the copy pair management information 1210.

Subsequently, the I/O controller 1300A in the primary storage apparatus 300A instructs a disk controller 1400A in the primary storage apparatus 300A to start initial copy processing (step 7020).

Then, the disk controller 1400A in the primary storage apparatus 300A reads data from the primary volume identified by the logical volume ID 12101 in the copy pair management information 1210A. The disk controller 1400A in the primary storage apparatus 300A stores the read data in the cache memory 1100A (step 7030).

Moreover, the disk controller 1400A in the primary storage apparatus 300A notifies the I/O controller 1300A in the primary storage apparatus 300A of the address for the block from which the data has been read, the data length of the read data, and the address in the cache memory in which the data has been stored (step 7030).

Figure 16:
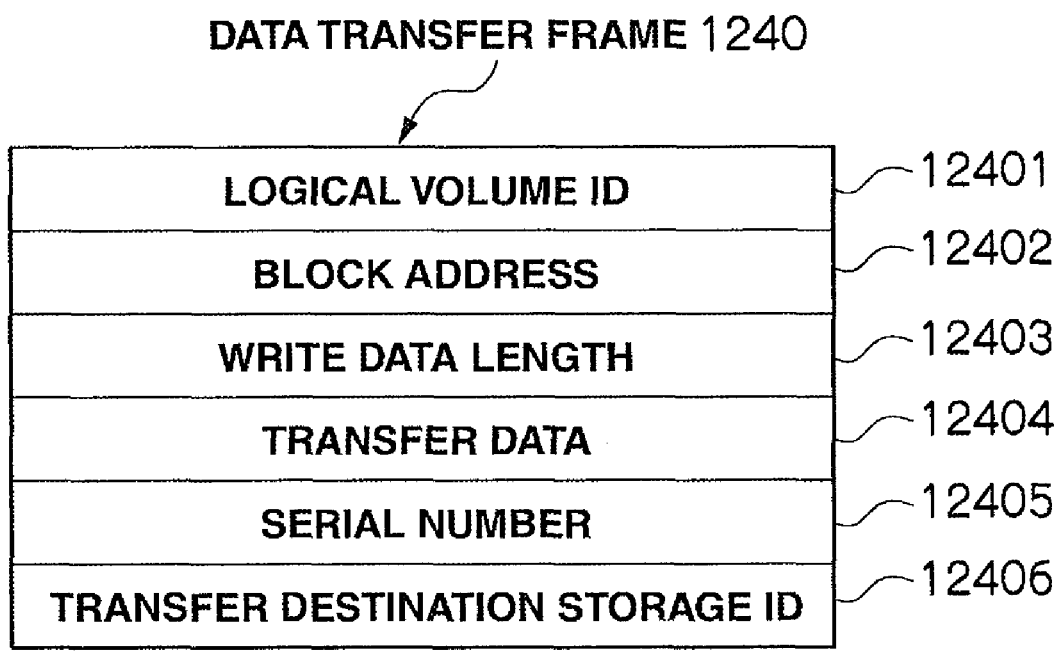
FIG. 16 is an explanatory diagram of a configuration for a data transfer frame used in remote copy in the first embodiment.

Then, the I/O controller 1300A in the primary storage apparatus 300A creates a data transfer frame 1240 based on the information given from the disk controller 1400A in the primary storage apparatus 300A and the copy pair management information 1210A. FIG. 16 shows an example of the data transfer frame 1240.

Specifically, the I/O controller 1300A in the primary storage apparatus 300A stores the copy target volume ID 12104 in the copy pair management information 1210A for a logical volume ID 12401 in the data transfer frame 1240. The I/O controller 1300A in the primary storage apparatus 300A then stores the block address given from the disk controller 1400A for a block address 12402 in the data transfer frame 1240.

Next, the I/O controller 1300A in the primary storage apparatus 300A stores the data length given from the disk controller 1400A for write data length 12403 in the data transfer frame 1240. The I/O controller 1300A in the primary storage apparatus 300A stores part or all of the data stored in the cache memory 1100A for transfer data 12404 in the data transfer frame 1240. Also, only during the first transfer, the I/O controller 1300A stores the volume management information 1250 for the transfer data 12404.

The I/O controller 1300A in the primary storage apparatus 300A then stores, for a serial number 12405 in the data transfer frame 1240, the order in which the data transfer frame 1240 is created in initial copy. Moreover, the I/O controller 1300A in the primary storage apparatus 300A stores the copy target storage ID 12103 in the copy pair management information 1210 for a transfer destination storage ID 12406 in the data transfer frame 1240.

The I/O controller 1300A in the primary storage apparatus 300A then transmits the created data transfer frame 1240 to the copy destination secondary storage apparatus 300B (step 7040).

An I/O controller 1300B in the secondary storage apparatus 300B receives the data transfer frame 1240. The I/O controller 1300B in the secondary storage apparatus 300B then creates copy pair management information 1210B based on the received data transfer frame 1240, etc. (step 7050).

Specifically, the I/O controller 1300B in the secondary storage apparatus 300B stores the logical volume ID 12401 in the received data transfer frame 1240 for the logical volume ID 12101 in the copy pair management information 1210B. Then, the I/O controller 1300B in the secondary storage apparatus 300B stores "initial copy" for the copy status information 12102 in the copy pair management information 1210B.

Subsequently, the I/O controller 1300B in the secondary storage apparatus 300B stores, for the copy target storage ID 12103 in the copy pair management information 1210B, the identifier for the primary storage apparatus 300A as the transmission source for the received data transfer frame 1240. The I/O controller 1300B in the secondary storage apparatus 300B then stores, for the copy target volume ID 12104 in the copy pair management information 1210B, the identifier for the primary volume where the transfer data 12404 in the data transfer frame 1240 has been stored.

Then, the I/O controller 1300B in the secondary storage apparatus 300B stores "remote copy" for the copy type 12107 in the copy pair management information 1210B.

The I/O controller 1300B in the secondary storage apparatus 300B writes the transfer data 12404 in the data transfer frame 1240 to the secondary volume identified by the logical volume ID 12401 in the data transfer frame 1240 (step 7060).

The primary storage apparatus 300A and the secondary storage apparatus 300B repeatedly execute steps 7030 through 7060. As a result, all the data in the primary volume is stored in the secondary volume.

The primary storage apparatus 300A and the secondary storage apparatus 300B then terminate initial copy processing. After the primary storage apparatus 300A terminates initial copy, the primary storage apparatus 300A stores "primary volume" for the copy status information 12102 in the copy pair management information 1210A. Also, the secondary storage apparatus 300B stores "secondary volume" in the copy status information 12102 in the copy pair management information 1210B.

(1-16) Differential Copy Processing

Figure 17:
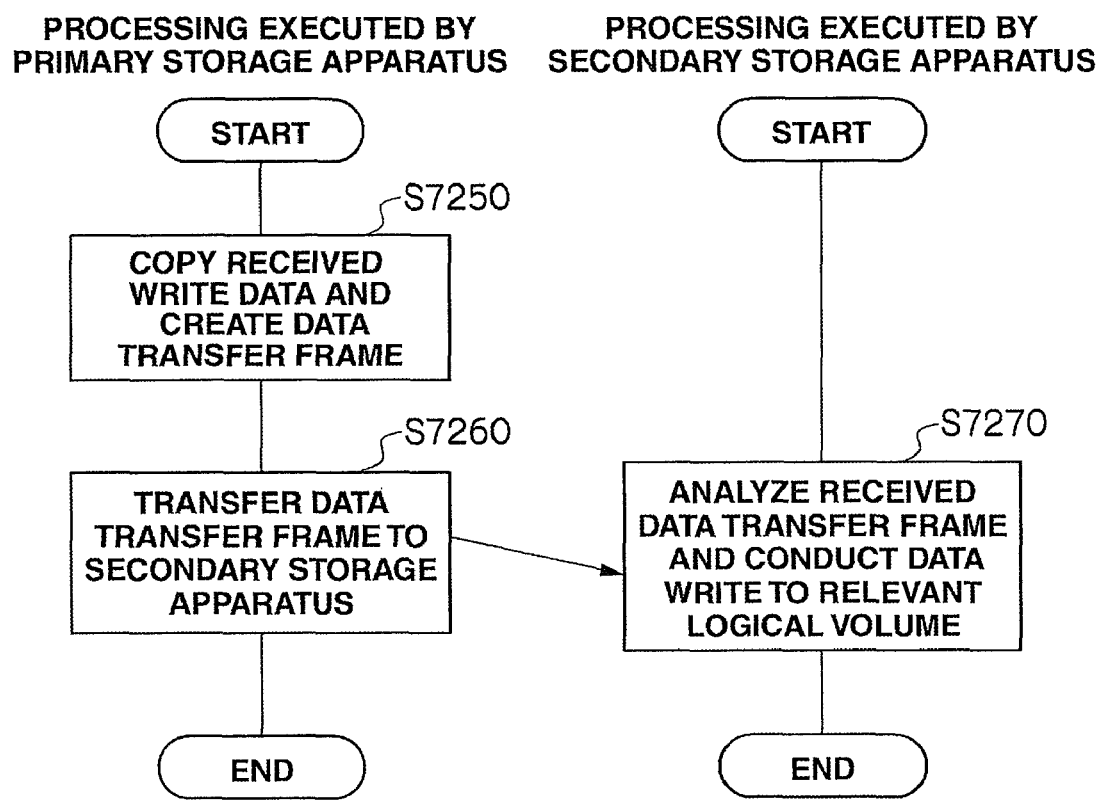
FIG. 17 is a flowchart of differential copy processing executed between primary and secondary storage apparatuses in the first embodiment.

FIG. 17 is a flowchart of differential copy processing executed by the storage apparatus 300 in the first embodiment of the invention.

After the termination of initial copy processing, the primary and secondary storage apparatuses 300 start operation of differential copy. More specifically, the primary and secondary storage apparatuses 300 start operation of differential copy after the data in the primary volume and the data in the secondary volume conform to each other.

Specifically, upon receiving a write request after the termination of initial copy processing, the primary storage apparatus 300A executes differential copy processing. For example, the primary storage apparatus 300A writes data in the primary volume, and writes the write data in the secondary volume accordingly.

The primary storage apparatus 300A receives the I/O request 7300. The I/O request 7300 is a write request. The primary storage apparatus 300A extracts the data requested to be written (write data) from the option 73005 in the I/O request 7300. The primary storage apparatus 300A extracts the storage apparatus ID and H/W volume ID from the destination 73001 in the I/O request 7300.

Then, the primary storage apparatus 300A writes the extracted write data to the logical volume Vol identified by the acquired logical volume ID.

The primary storage apparatus 300A creates the data transfer frame 1240 (step 7250).

Specifically, the copy source primary storage apparatus 300A selects the copy pair management information 1210A including the logical volume ID 12101 corresponding to the acquired logical volume ID. The copy source primary storage apparatus 300A then extracts the copy target storage ID 12103 and the copy target volume ID 12104 from the selected copy pair management information 1210A.

Next, the primary storage apparatus 300A stores the extracted copy target volume ID 12104 for the logical volume ID 12401 in the data transfer frame 1240. The primary storage apparatus 300A then stores, for the block address 12402 in the data transfer frame 1240, the address for the block in which the write data has been stored.

Subsequently, the primary storage apparatus 300A stores the size of the write data for the write data length 12403 in the data transfer frame 1240. The primary storage apparatus 300A then stores part or all of the write data for the transfer data 12404 in the data transfer frame 1240.

The primary storage apparatus 300A stores, for the serial number 12405 in the data transfer frame 1240, the order in which the transfer frame 1240 is created in differential copy. The primary storage apparatus 300A stores the extracted copy target storage ID 12103 for the transfer destination storage ID 12406 in the data transfer frame 1240.

Next, the primary storage apparatus 300A transmits the created data transfer frame 1240 to the secondary storage apparatus 300B (step 7260).

The secondary storage apparatus 300B receives the data transfer frame 1240. Then, the secondary storage apparatus 300B writes the transfer data 12404 in the data transfer frame 1240 to the logical volume Vol identified by the logical volume ID 12401 in the data transfer frame 1240 (step 7270).

The storage apparatuses 300 terminate differential copy processing with respect to one I/O request.

(1-17) Effects of First Embodiment

According to this embodiment, remote copy can be achieved with respect to all the volumes that are both recognized and not recognized by the management computer that makes the copy request. In particular, copy can be conducted with respect to the volumes, in the primary storage apparatus and secondary storage apparatus, which are both recognized and not recognized by the management computer.

Also, according to this embodiment, high security can be achieved with a storage system employing an in-band system.

(2) Second Embodiment

A second embodiment of the invention will be described with reference to figures.

(2-1) System Configuration

Figure 18:
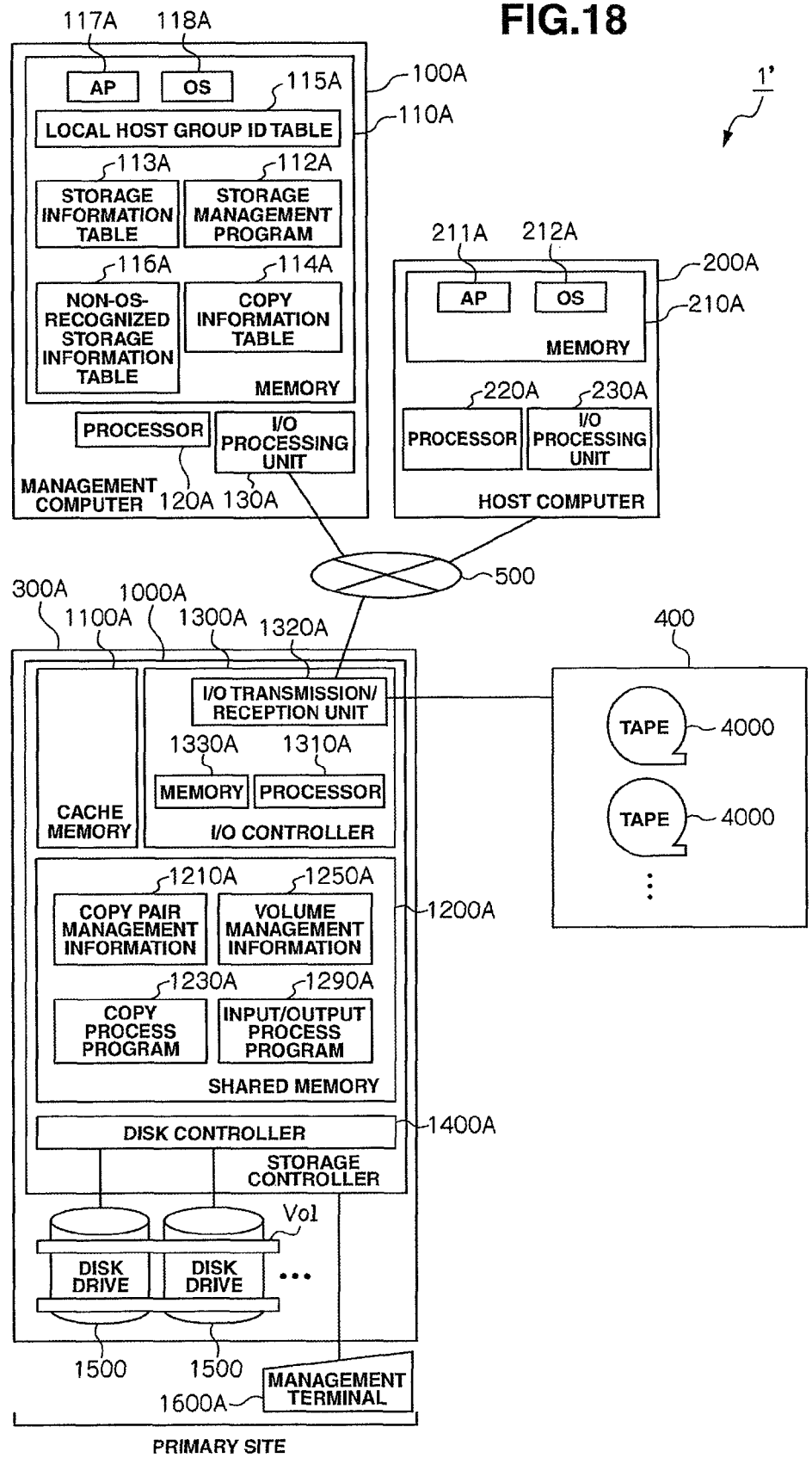
FIG. 18 is a block diagram showing a configuration for a storage system in a second embodiment.

FIG. 18 is a block diagram of a configuration for a storage system 1' in a second embodiment of the invention. As shown in FIG. 18, the management computer 100, the host computer 200, and the storage apparatus 300 are connected to one another via the data communication line 500 in one site in the second embodiment. Also, the I/O transmission/reception unit 1320 in the storage apparatus 300 is connected to a tape device 400 via a network (not shown in the figure) for copy. Among the components, the management computer 100, the host computer 200, and the storage apparatus 300 are the same as the management computer 100A, the host computer 200A, and the storage apparatus 300A in the first embodiment. Also, the tape device 400 has plural tapes 4000 that provide physical volumes for storing data.

Figure 19:
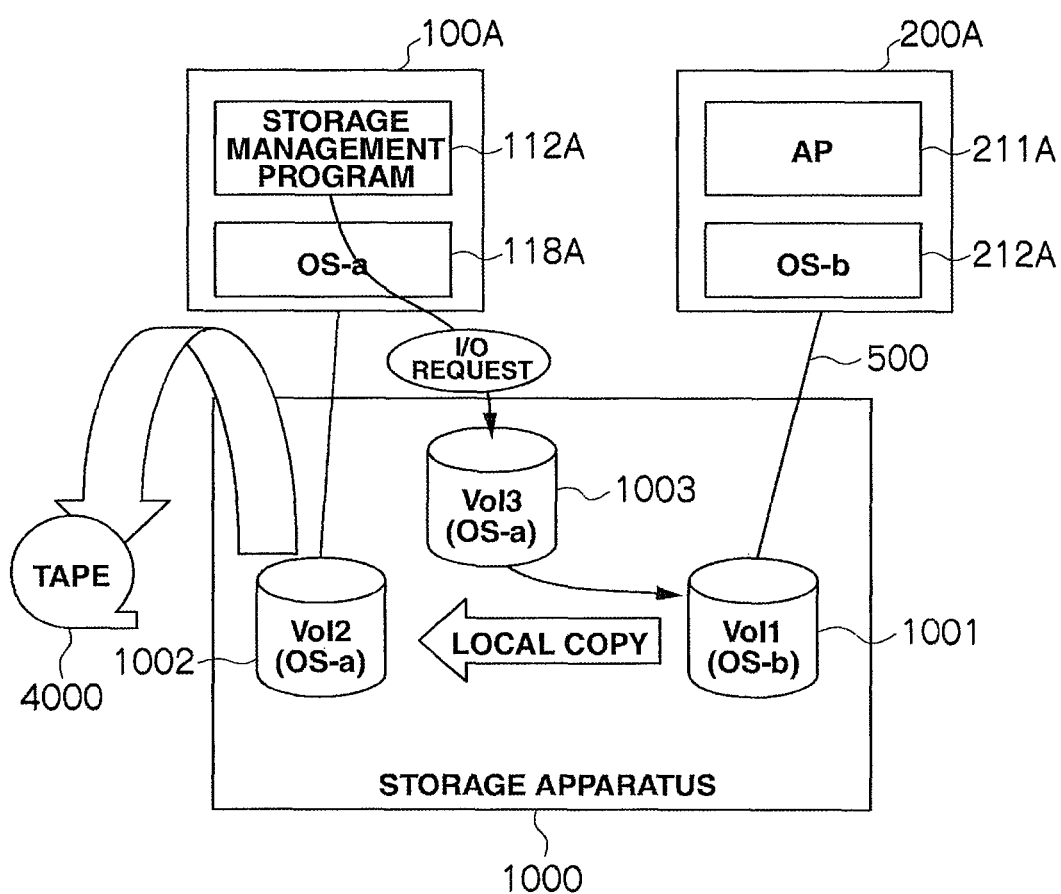
FIG. 19 is an explanatory diagram showing copy control in the second embodiment.

FIG. 19 shows the outline of the configuration for the storage system 1' in the second embodiment of the invention. The logical volumes Vol recognized by the management computer 100 are the logical volumes 1002 and 1003, and the unrecognized logical volume Vol is the logical volume 1001. The logical volume 1003 is a command device. The configuration for the storage apparatus 300 is the same as for the storage apparatus 300A that has been described in the first embodiment.

In the second embodiment, local copy is conducted between the logical volumes Vol in the storage apparatus 300, and the management computer 100 conducts backup with the tape. With the copy source primary logical volume 1001, which serves as the volume not recognized by the management computer 100, and the copy destination secondary logical volume 1002, which serves as the volume recognized by the management computer 100, copy control can be performed by the same method as in the first embodiment except the point that an I/O request that orders local copy is used. After the termination of the local copy between the volumes, the storage apparatus 300 further copies the copy data in the copy destination secondary volume 1002 to the tapes 4000.

(2-2) Effects of Second Embodiment

According to this embodiment, local copy can be achieved with respect to all the volumes that are both recognized and not recognized by the management computer that makes the copy request. In particular, copy can be conducted with respect to the volumes, in the storage apparatus, which are both recognized and not recognized by the management computer.

Also, according to this embodiment, high security can be achieved with a storage system employing an in-band system.

(3) Other Embodiment

The volumes that are recognized and not recognized by the management computer have been described in the first and second embodiments. However, copy control can be achieved with the above-described procedure also regarding the volumes that are recognized and not recognized by the host computer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system in which a management computer and a host computer are connected to one or more storage apparatuses via a data communication line, wherein:
   the one or more storage apparatuses provide the management computer with at least one first volume for storing data from the management computer, provide the host computer with at least one second volume for storing data from the host computer, and manage a volume address for the one or more storage apparatuses to manage the first volume and the second volume in the one or more storage apparatuses; and
   the management computer issues a command specifying an arbitrary volume address to the one or more storage apparatuses, and designates, when receiving a normal response from the arbitrary volume address, a volume with the arbitrary volume address as the second volume.

2. The storage system according to claim 1, wherein:
   the one or more storage apparatuses provide two or more of the first volumes, and have, among the first volumes, a command volume that assigns the command specifying the arbitrary volume address to the second volume; and
   the management computer issues the command specifying the arbitrary volume address to the command volume when the second volume serves as a copy source target, and issues the command specifying the arbitrary volume address to the first volume when the first volume serves as a copy source target.

3. The storage system according to claim 1, wherein:
   the one or more storage apparatuses provide two or more of the first volumes and two or more of the second volumes; give a first group identifier to the first volumes that form a first volume group; give a second group identifier to the second volumes that form a second volume group; determine a copy source primary group identifier and a copy destination secondary group identifier based on the first group identifier and the second group identifier to set one or more pairs, and give a copy group identifier to the one or more pairs to manage the one or more pairs; and create the command specifying the arbitrary volume address based on a pair that belongs to an arbitrary copy group.

4. The storage system according to claim 3, wherein:
   the one or more storage apparatuses are given an apparatus identifier, and manage the apparatus identifier with the first group identifier and the second group identifier.

5. The storage system according to claim 3, wherein the first volume group and the second volume group are provided in one storage apparatus.

6. The storage system according to claim 1, wherein:
   the one or more storage apparatuses are connected to a tape device; and
   the tape device provides a third volume that stores copy data for the data stored in the first volume and the second volume.

7. A copy method for a storage system in which a management computer and a host computer are connected to one or more storage apparatuses via a data communication line, the method comprising:
   under the control of the one or more storage apparatuses, providing the management computer with at least first volume for storing data from the management computer, providing the host computer with at least second volume for storing data from the host computer, and managing a volume address for the one or more storage apparatuses to manage the first volume and the second volume in the one or more storage apparatus; and under the control of the management computer, issuing a command specifying an arbitrary volume address to the one or more storage apparatuses, and designating, when receiving a normal response from the arbitrary volume address, a volume with the arbitrary volume address as the second volume.

8. The copy method according to claim 7, comprising:

under the control of the one or more storage apparatuses, providing two or more of the first volumes, and setting, among the first volumes, a command volume that assigns the command specifying the arbitrary volume address to the second volume; and under the control of the management computer, issuing the command specifying the arbitrary volume address to the command volume when the second volume serves as a copy source target, and issuing the command specifying the arbitrary volume address to the first volume when the first volume serves as a copy source target.

9. The copy method according to claim 7, comprising, under the control of the one or more storage apparatuses:

providing two or more of the first volumes and two or more of the second volumes;

giving a first group identifier to the first volumes that form a first volume group;

giving a second group identifier to the second volumes that form a second volume group;

determining a copy source primary group identifier and a copy destination secondary group identifier based on the first group identifier and the second group identifier to set one or more pairs, and giving a copy group identifier to the one or more pairs to manage the one or more pairs; and creating the command specifying the arbitrary volume address based on a pair that belongs to an arbitrary copy group.

10. The copy method according to claim 9, comprising, under the control of the one or more storage apparatuses, being given an apparatus identifier, and managing the apparatus identifier with the first group identifier and the second group identifier.

11. The copy method according to claim 9, comprising providing the first volume group and the second volume group in one storage apparatus.

12. The copy method according to claim 7, in which the one or more storage apparatuses are connected to a tape device, comprising, under the control of the tape device, providing a third volume that stores copy data for the data stored in the first volume and the second volume.

* * * * *